US012794612B2

(12) United States Patent
Cherian et al.

(10) Patent No.: US 12,794,612 B2
(45) Date of Patent: Nov. 10, 2026

(54) POWER CONTROL FOR COORDINATED TRANSMISSIONS FROM OVERLAPPING WIRELESS LOCAL AREA NETWORKS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 18/507,457

(22) Filed: Nov. 13, 2023

(65) Prior Publication Data

US 2024/0080146 A1 Mar. 7, 2024

Related U.S. Application Data

(63) Continuation of application No. 16/589,041, filed on Sep. 30, 2019, now Pat. No. 11,818,061.

(Continued)

(51) Int. Cl.

*H04L 1/00* (2006.01)
*H04L 1/1607* (2023.01)

(Continued)

(52) U.S. Cl.

CPC ........... *H04L 5/0032* (2013.01); *H04W 52/40* (2013.01); *H04W 72/27* (2023.01);

(Continued)

(58) Field of Classification Search

CPC ... H04L 5/0032; H04L 1/1614; H04L 1/0006; H04B 17/318; H04W 52/40; H04W 72/27; H04W 72/541; H04W 84/12

See application file for complete search history.

(56) References Cited

U.S. PATENT DOCUMENTS 10,439,989 B2 * 10/2019 Wu ..................... H04L 61/5014
10,785,772 B2 9/2020 Chun et al.

(Continued)

FOREIGN PATENT DOCUMENTS

| | | | |
|---|---|---|---|
| CN | 106664165 | A | 5/2017 |
| EP | 3139671 | A1 | 3/2017 |
| WO | WO-2017181046 | A2 | 10/2017 |

OTHER PUBLICATIONS

Abinader F.M., et al., "Distributed Wi-Fi Interference Coordination for Dense Deployments", Wireless Personal Communications, Springer, Dordrecht, NL, vol. 97, No. 1, Jun. 3, 2017 (Jun. 3, 2017), pp. 1033-1058, XP036343254, ISSN: 0929-6212, DOI: 10.1007/S11277-017-4550-3 [retrieved on Jun. 3, 2017] p. 5, paragraph 3-p. 6, paragraph 4, p. 7, paragraph 3-p. 8, paragraph 3.

(Continued)

*Primary Examiner* — Jayanti K Patel
(74) *Attorney, Agent, or Firm* — Holland & Hart LLP

(57) ABSTRACT

This disclosure provides systems, devices, apparatus, and methods, including computer programs encoded on storage media, for preventing or reducing cross-network interference associated with a coordinated transmission on a wireless channel. A first access point (AP) of a first basic service set (BSS) and a second AP of a second BSS can concurrently use the wireless channel using a coordinated transmission during a portion of a transmission opportunity (TXOP). The TXOP owner (such as the first AP) may allocate a resource assignment to the second AP such that the resource assignment is conditionally available for use by the second AP in (Continued)

a coordinated transmission. The condition may prevent the resource assignment from being used by the second BSS when its use would cause interference to the first BSS. The condition may be based on a transmit power for downlink communication or uplink communication in the second BSS.

20 Claims, 18 Drawing Sheets

Related U.S. Application Data

(60) Provisional application No. 62/739,768, filed on Oct. 1, 2018.

(51) Int. Cl.
*H04L 5/00* (2006.01)
*H04W 52/40* (2009.01)
*H04W 72/27* (2023.01)
*H04W 72/541* (2023.01)
*H04W 52/24* (2009.01)
*H04W 84/12* (2009.01)

(52) U.S. Cl.
CPC ........ *H04W 72/541* (2023.01); *H04W 52/243* (2013.01); *H04W 84/12* (2013.01)

(56) References Cited

U.S. PATENT DOCUMENTS 11,252,614 B2 2/2022 Verma
2003/0112820 A1* 6/2003 Beach ................. H04L 12/4625 370/465
2006/0291432 A1* 12/2006 Xhafa ................... H04W 36/06 370/336
2011/0188391 A1* 8/2011 Sella ................... H04L 67/1051 370/252
2012/0142392 A1* 6/2012 Patel ................... H04W 52/247 455/522
2014/0112242 A1* 4/2014 Vilmur ................. H04B 7/2606 370/327
2014/0119220 A1* 5/2014 Wang .................. H04W 52/367 370/252
2014/0293911 A1* 10/2014 Cheong ............... H04L 27/2657 370/329
2014/0328264 A1 11/2014 Merlin et al.
2014/0362840 A1* 12/2014 Wong .................... H04L 1/0003 370/338
2015/0263957 A1* 9/2015 Wang .................... H04W 76/12 370/230
2015/0319700 A1* 11/2015 Oteri ..................... H04W 24/10 455/127.1
2016/0269087 A1* 9/2016 Subramanian ......... H04B 7/024
2017/0006614 A1* 1/2017 Reddy ................... H04W 48/16
2017/0077999 A1 3/2017 Asterjadhi et al.
2017/0180103 A1 6/2017 Min et al.
2017/0303276 A1* 10/2017 Cheng ................... H04L 1/0002
2018/0027573 A1* 1/2018 Cariou ................ H04W 52/367 370/329
2018/0049077 A1 2/2018 Mestanov et al.
2018/0139708 A1* 5/2018 Zhan ........................ H01Q 1/02
2018/0263044 A1 9/2018 Zhou et al.
2019/0045461 A1* 2/2019 Fang ................... H04W 52/245
2020/0015164 A1* 1/2020 Asterjadhi ........ H04W 52/0229
2020/0037275 A1 1/2020 Liu et al.
2020/0045555 A1 2/2020 Huang et al.
2020/0076519 A1* 3/2020 Asterjadhi ............ H04L 1/0027
2020/0106579 A1 4/2020 Cherian et al.
2020/0120544 A1 4/2020 Liu et al.
2020/0245352 A1 7/2020 Seok et al.
2020/0267636 A1 8/2020 Cavalcanti et al.
2020/0374872 A1 11/2020 Wu et al.
2020/0404549 A1 12/2020 Verma et al.

OTHER PUBLICATIONS

International Preliminary Report on Patentability—PCT/US2019/054018 The International Bureau of WIPO—Geneva, Switzerland, Apr. 15, 2021.
International Search Report and Written Opinion—PCT/US2019/054018—ISA/EPO—Jan. 20, 2020.
U.S. Appl. No. 62/726,968, filed Sep. 4, 2018, 96 Pages.

* cited by examiner

UPLINK COORDINATED TRANSMISSIONS

DOWNLINK COORDINATED TRANSMISSIONS

UPLINK COORDINATED TRANSMISSIONS

DOWNLINK COORDINATED TRANSMISSIONS

POWER CONTROL FOR COORDINATED TRANSMISSIONS FROM OVERLAPPING WIRELESS LOCAL AREA NETWORKS

CROSS-REFERENCE TO RELATED APPLICATIONS

This Patent Application is a continuation of U.S. patent application Ser. No. 16/589,041 filed Sep. 30, 2019, entitled "POWER CONTROL FOR COORDINATED TRANSMISSIONS FROM OVERLAPPING WIRELESS LOCAL AREA NETWORKS," which claims priority to U.S. Provisional Patent Application No. 62/739,768 filed Oct. 1, 2018, entitled "POWER CONTROL FOR COORDINATED TRANSMISSIONS FROM OVERLAPPING WIRELESS LOCAL AREA NETWORKS," and assigned to the assignee hereof. The disclosure of the prior Application is considered part of and is incorporated by reference in this Patent Application.

TECHNICAL FIELD

This disclosure generally relates to the field of wireless communication, and more particularly to coordinated transmissions from overlapping wireless local area networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. A STA may have a wireless connection (referred to as a wireless association, or just "association") when it has authenticated and established a wireless session with the AP. One or more STAs in the WLAN may utilize the shared wireless communication medium to communicate with the AP. The AP may have an opportunity to influence the distribution of resources available in the shared wireless communication medium.

As more WLANs are deployed in an environment, the wireless medium may be shared by multiple APs and their respective BSSs. For example, a first BSS (managed by a first AP) may utilize a first wireless channel. A second BSS (managed by a second AP) also may utilize the first wireless channel for separate communications unrelated to the first BSS. The second BSS may be referred to as an overlapping BSS (OBSS) in relation to the first BSS. It may be desirable to coordinate communication by multiple BSSs in an environment to increase spectral efficiency and quality of service for the WLAN devices in their respective BSSs.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. In some implementations, the method may be performed by a first access point (AP) of a first basic service set (BSS). The method could also be performed by a wireless device (such as a station) that is providing at least part of the functionality of an AP in the first BSS. The method may include transmitting, during a first portion of a transmission opportunity, a multi-AP scheduling trigger (MAP-Sch-Trigger) message to a plurality of APs including one or more second APs of one or more respective second BSSs. The method may include receiving one or more scheduling indications from the one or more second APs in response to the MAP-Sch-Trigger message. The method may include allocating resources to the one or more second APs, based on the scheduling indications, for a coordinated transmission on a wireless channel during a second portion of the transmission opportunity, the allocated resources for each of the one or more second APs being available for use by the respective second AP or a respective second station (STA) of the respective second BSS subject to a condition based on a respective transmit power of the second AP or the second STA. The method may include transmitting a multi-AP coordinated transmission trigger (MAP-CT-Trigger) message to the plurality of APs to indicate the allocated resources and a start of the second portion of the transmission opportunity. The method may include transmitting data to, or receiving data from, at least a first STA of the first BSS as part of the coordinated transmission during the second portion of the transmission opportunity.

Another innovative aspect of the subject matter described in this disclosure can be implemented in a method for wireless communication. In some implementations, the method may be performed by a first access point (AP) of a wireless local area network (WLAN). The method could also be performed by a wireless device (such as a station) that is providing at least part of the functionality of an AP in the WLAN. The method may include communicating a multi-AP scheduling trigger (MAP-Sch-Trigger) message during a first portion of a transmission opportunity of the wireless channel. The first AP may be a controller of the transmission opportunity. The method may include providing a resource assignment to the second AP for use in a coordinated transmission on the wireless channel during a second portion of the transmission opportunity. The resource assignment may be conditionally available for use by the second WLAN subject to a condition based, at least in part, on an amount of interference that its use would cause to the first WLAN. The method may include communicating a multi-AP coordinated transmission trigger (MAP-CT-Trigger) message to indicate a start of the second portion of the transmission opportunity. The method may include communicating between the first AP and at least a first station (STA) associated with the first AP via the coordinated transmission during the second portion of the transmission opportunity.

Another innovative aspect of the subject matter described in this disclosure can be implemented in a wireless communication device. In some implementations, the wireless communication device may be for use in a first AP of a first BSS. The wireless communication device may include at least one modem, at least one processor communicatively coupled with the at least one modem. The wireless communication device may include at least one memory communicatively coupled with the at least one processor and storing processor-readable code that, when executed by the at least one processor in conjunction with the at least one modem, cause the wireless communication device to implement any of the methods in this disclosure.

Another innovative aspect of the subject matter described in this disclosure can be implemented in a tangible computer-readable storage medium that includes non-transitory processor-executable code which, when executed by at least one processor of a wireless device, may cause the wireless device to implement any of the methods in this disclosure.

In some implementations, the methods, wireless communication devices, and computer-readable storage media may be configured to determine that the first AP is the controller of the transmission opportunity based on a determination that the first AP has won a contention for the transmission opportunity.

In some implementations, the first AP may be a master AP or other AP having a dedicated role as the controller of transmission opportunities including the transmission opportunity.

In some implementations, the coordinated transmission includes concurrent uplink communications from the first STA to the first AP and from one or more of the second STAs to the respective second APs. The condition may be configured to prevent the second STAs from using the respective allocated resources when the transmit power of the respective second STA is above a threshold.

In some implementations, the methods, wireless communication devices, and computer-readable storage media may be configured to include a coordinated uplink (CO-UL) parameter in the MAP-Sch-Trigger message or the MAP-CT-Trigger message, the CO-UL parameter indicating the condition.

In some implementations, the CO-UL parameter based on the transmit power of the first AP and an amount of interference that the first AP will tolerate.

In some implementations, the MAP-Sch-Trigger message is configured to cause one or more of the second APs to retransmit the CO-UL parameter to one or more of the respective second STAs. The CO-UL parameter may be usable by each of the second STAs to determine whether its transmit power would cause interference to the first AP above the threshold.

In some implementations, the coordinated transmission may include concurrent downlink communications from the first AP to the first STA and from one or more of the second APs to the respective second STAs. The condition may be configured to prevent the second APs from using the respective allocated resources when the transmit power of the respective second AP is above a threshold.

In some implementations, the methods, wireless communication devices, and computer-readable storage media may be configured to, during the first portion of the transmission opportunity, indicate to the first STA to transmit a test communication for measuring a first received signal strength indicator (RSSI) between the first STA and the first AP. In some implementations, the methods, wireless communication devices, and computer-readable storage media may be configured to determine a coordinated downlink (CO-DL) parameter based, at least in part, on an estimated transmit power of the first AP for the coordinated transmission and an estimated channel quality between the first AP and the first STA. The estimated channel quality may be estimated based on the first RSSI. In some implementations, the methods, wireless communication devices, and computer-readable storage media may be configured to include the CO-DL parameter to the second AP in either the MAP-Sch-Trigger message or the MAP-CT-Trigger message.

In some implementations, the test communication may be a null packet or a quality of service (QoS) packet.

In some implementations, the methods, wireless communication devices, and computer-readable storage media may be configured to cause one or more of the second APs to measure a respective second RSSI of the test communication from the first STA. The CO-DL parameter and the respective second RSSIs may be usable by the second APs to determine whether their respective transmit power would cause interference to the first STA above the threshold.

Another innovative aspect of the subject matter described in this disclosure can be implemented in a method for wireless communication. In some implementations, the method may be performed by a second AP. Another innovative aspect of the subject matter described in this disclosure can be implemented in a second AP. The second AP may include at least one processor and at least one memory communicatively coupled with the at least one processor. The memory may store processor-readable code that, when executed by the at least one processor, may cause the second AP to perform operations described as the method. Another innovative aspect of the subject matter described in this disclosure can be implemented in a tangible computer-readable storage medium that includes non-transitory processor-executable code which, when executed by at least one processor of a STA, may cause the STA to perform operations of the described methods.

In some implementations, the methods and operations may include receiving, during a first portion of a transmission opportunity, a multi-AP scheduling trigger (MAP-Sch-Trigger) message from a first AP of a first BSS. In some implementations, the first AP may be a controller of the transmission opportunity. In some implementations, the methods and operations may include transmitting one or more scheduling indications from the second AP to the first AP in response to the MAP-Sch-Trigger message. In some implementations, the methods and operations may include receiving a multi-AP coordinated transmission trigger (MAP-CT-Trigger) message from the first AP, wherein the MAP-CT-Trigger message indicates allocated resources and a start of a second portion of the transmission opportunity. The allocated resources may be allocated by the first AP based on the scheduling indications for a coordinated transmission on a wireless channel during the second portion of the transmission opportunity. The allocated resources for the second AP may be available for use by the second AP or a second station (STA) of the second BSS subject to a condition based on a respective transmit power of the second AP or the second STA. In some implementations, the methods and operations may include, concurrent with a communication between the first AP and a first STA during the second portion of the transmission opportunity, transmitting data to, or receiving data from, a second STA as part of the coordinated transmission using the allocated resources.

In some implementations, the coordinated transmission includes concurrent uplink communications from the first STA to the first AP and from the second STA to the second AP. The condition may be configured to prevent the second STA from using the allocated resources when the transmit power of the second STA is above a threshold.

In some implementations, the methods and operations may include receiving a coordinated uplink (CO-UL) parameter in the MAP-Sch-Trigger message or the MAP-CT-Trigger message, the CO-UL parameter indicating the condition. For example, the CO-UL parameter may be based on the transmit power of the first AP and an amount of interference that the first AP will tolerate.

In some implementations, the methods and operations may include retransmitting the CO-UL parameter to the second STA in a scheduling message. The CO-UL parameter may be usable by the second STA to determine whether its transmit power would cause an amount of interference to the first AP above the threshold.

In some implementations, the coordinated transmission may be configured for concurrent downlink communication from the first AP to the first STA and from the second AP to the second STA. The condition may be configured to prevent the second AP from using the resource assignment when its transmit power would cause an amount of interference to the first STA above a threshold.

In some implementations, the methods and operations may include, during the first portion of the transmission opportunity, receiving a coordinated downlink (CO-DL) parameter from the first AP in the MAP-Sch-Trigger message or the MAP-CT-Trigger message. The CO-DL parameter may indicate the condition.

In some implementations, the methods and operations may include measuring a first received signal strength indicator (RSSI) between the first STA and the second AP based on a test communication transmitted by the first STA. In some implementations, the methods and operations may include determining a downlink power limit based, at least in part, on the CO-DL parameter and the first RSS. In some implementations, the methods and operations may include determining whether to use the resource assignment for the concurrent downlink communication based, at least in part, on the downlink power limit and a power setting of the second AP.

Another innovative aspect of the subject matter described in this disclosure can be implemented in a method for wireless communication. In some implementations, the method may be performed by a second STA of a second BSS. Another innovative aspect of the subject matter described in this disclosure can be implemented in a second STA. The second STA may include at least one processor and at least one memory communicatively coupled with the at least one processor. The memory may store processor-readable code that, when executed by the at least one processor, may cause the second STA to perform operations described as the method. Another innovative aspect of the subject matter described in this disclosure can be implemented in a tangible computer-readable storage medium that includes non-transitory processor-executable code which, when executed by at least one processor of a second STA, may cause the second STA to perform operations. In some implementations, the methods and operations may include receiving, during a first portion of a transmission opportunity and from the second AP, a message that includes allocated resources of the transmission opportunity for a coordinated transmission during a second portion of the transmission opportunity controlled by a first AP of a first BSS. In some implementations, the methods and operations may include determining at least one condition to prevent the allocated resources from being used based on whether a transmit power of the second STA would cause interference above a threshold amount to a communication between the first AP and a first STA associated with the first AP. In some implementations, the methods and operations may include, concurrent with a communication between the first STA and the first AP, transmitting data from the second STA to the second AP as part of the coordinated transmission during the second portion of the transmission opportunity based on a determination that the at least one condition is satisfied.

In some implementations, the condition may be based on an amount of interference that the first AP will tolerate as a result of the second STA using the allocated resources.

In some implementations, the methods and operations may include receiving a coordinated uplink (CO-UL) parameter and an identifier of the first AP. In some implementations, the methods and operations may include detecting, using the identifier of the first AP, a multi-AP coordinated transmission trigger (MAP-CT-Trigger) message transmitted from the first AP, the MAP-CT-Trigger message to indicate a start of the second portion of the transmission opportunity. In some implementations, the methods and operations may include determining whether to use the allocated resources based, at least in part, on the CO-UL parameter.

In some implementations, the methods and operations may include measuring a signal strength of the MAP-CT-Trigger message. In some implementations, the methods and operations may include determining an uplink power limit for the coordinated transmission from the second STA to the second AP based on the signal strength and the CO-UL parameter In some implementations, the methods and operations may include determining whether the condition is satisfied based, at least in part, on the uplink power limit and a transmit power setting of the second STA.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1A:
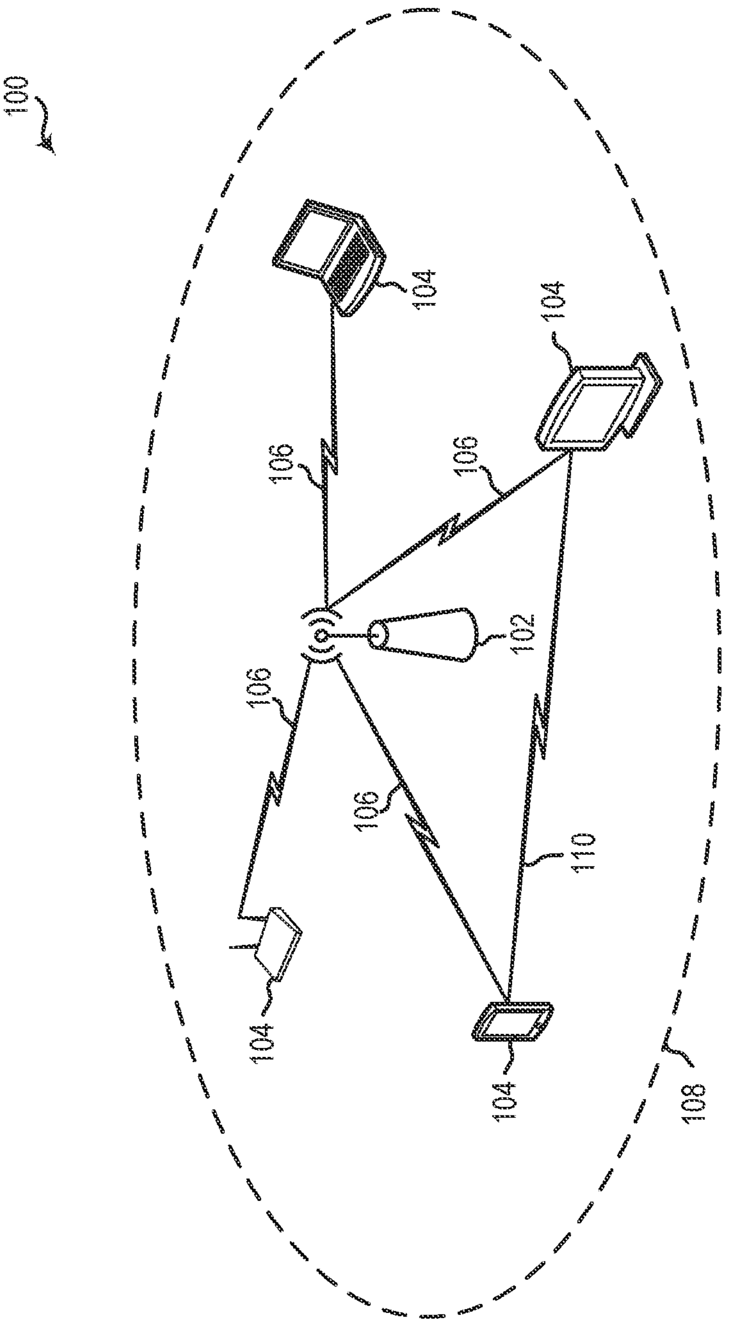
FIG. 1A shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input-multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

A wireless local area network (WLAN, sometimes also referred to as a Wi-Fi™ network) in a home, apartment, business, or other area may include one or more WLAN devices. Each WLAN device may have a station (STA) interface which is an addressable entity that shares a wireless communication medium with other STAs. An access point (AP) is a WLAN device that includes a STA interface as well as a distribution system access function. For brevity in this disclosure, the WLAN devices may be referred to as an AP or a STA to distinguish the WLAN device's functional role in a WLAN. The basic building block of a WLAN is a Basic Service Set (BSS), which is managed by an AP and includes one or more STAs associated with the AP. For brevity in this disclosure, the first WLAN includes the first AP and a first STA associated with the first AP, while the second WLAN includes the second AP and a second STA associated with the second AP. The first WLAN may be referred to as a first BSS and the second WLAN may be referred to as a second BSS (or overlapping BSS, OBSS).

Various implementations of this disclosure generally relate to coordinated transmissions by different WLANs during a transmission opportunity (TXOP) of a wireless channel. In some aspects of the disclosure, a scheme for multi-AP scheduling is provided, in which a first AP may gain channel access and become a TXOP owner (which also may be referred to as a leader AP for the TXOP). For brevity in this disclosure, the examples consistently use the first AP as the TXOP owner and the second AP as a neighboring AP. In other examples (such as a different TXOP), the second AP may be the TXOP owner. As the TXOP owner, the first AP may coordinate with a second AP (such as a neighboring AP which is not a TXOP owner for this TXOP) to allow both the first AP and the second AP to concurrently access the wireless channel using a coordinated transmission during the TXOP. During a coordinated transmission, the first WLAN and the second WLAN may concurrently communicate using different resources of a wireless channel. The use of coordinated transmissions may increase the spectral efficiency of the wireless channel. However, a potential risk of coordinated transmissions is that the second WLAN may cause cross-network interference to the first WLAN. It may be desirable to limit or prevent the second WLAN from participating in the coordinated transmission when doing so would cause interference to the first WLAN.

In accordance with this disclosure, a first AP (as TXOP owner) may allocate a resource assignment that is conditionally available for use by the second AP in a coordinated transmission on the wireless channel during a portion of the TXOP. The first AP may communicate at least one condition to prevent the resource assignment from being used when its use would cause interference to the first AP. The first AP may send a parameter to the second AP that can be used by the second AP (or a STA associated with the second AP) to determine whether to participate in the coordinated transmission. For example, the parameter may be related to a power level, channel quality, interference tolerance, or combination thereof, about the first WLAN. The first AP can calculate the parameter and provide it to the second AP. The second AP can use the parameter as well as information about the second WLAN (such as power level or estimated signal path loss) to determine whether using the resource assignment would cause too much interference to the first WLAN.

In some aspects of this disclosure, the coordinated transmission may involve uplink communication (from STA to AP) by both the first WLAN and the second WLAN. For example, the first STA may communicate with the first AP while the second STA communicates with the second AP. However, if the first AP receives the second STA's uplink transmission above a threshold signal strength, the second STA's transmission may interfere with the first STA's uplink transmission. The first AP may not be able to successfully decode the first STA's uplink transmission. This may happen, for example, if the second STA is closer to the first AP than the first STA. In accordance with this disclosure, the second STA (or any other STAs of the OBSS) may refrain from participating in the coordinated transmission if doing so would interfere with uplink communications of the first WLAN. Because the first AP (and thus the first BSS) is the TXOP owner for the TXOP, a goal may be to ensure the first WLAN can use the TXOP even though it has provided a resource assignment to the second WLAN.

In some implementations, the first AP may send a coordinated uplink (CO-UL) parameter to the second AP. The CO-UL parameter may be included in a multi-AP scheduling trigger (MAP-Sch-Trigger) message that is used to provide the resource assignments to neighboring APs. The neighboring APs (such as the second AP) may retransmit the CO-UL parameter to their respective STAs (such as the second STA). The OBSS STAs may use the CO-UL parameter to determine whether to utilize the coordinated transmission. In some implementations, the CO-UL parameter is related to an amount of interference that the first AP will tolerate as a result of the OBSS STA using the resource assignment. The OBSS AP (such as the second AP) also may indicate an identifier of the first AP (such as a color code or BSSID) so that the OBSS STAs can detect a transmission from the first AP. The OBSS STAs may measure a signal strength of the transmission from the first AP. The OBSS STA also may estimate an amount of transmit power for it to communicate an OBSS uplink communication to the OBSS AP as part of the coordinated transmission. In some implementations, the OBSS STA may participate in the coordinated transmission after a determination that the estimated transmit power for the OBSS uplink communication is below a limit. The limit may be determined using the signal strength of the transmission from the first AP and the CO-UL parameter.

In some aspects of this disclosure, the coordinated transmission may involve downlink communication (from AP to STA) by both the first WLAN and the second WLAN. For example, the first AP may communicate with the first STA while the second AP communicates with the second STA. However, if the first STA receives the second AP's downlink transmission above a threshold signal strength, the second AP's transmission may interfere with the first AP's downlink transmission. The first STA may not be able to successfully decode the first AP's downlink transmission. This may happen, for example, if the first STA is closer to the second AP than the first AP. In accordance with this disclosure, the second AP may refrain from participating in the coordinated transmission if doing so would interfere with downlink communications of the first WLAN. Since the first AP (and thus the first BSS) is the TXOP owner for the TXOP, a goal may be to ensure the first WLAN can use the TXOP even though it has provided a resource assignment to the second WLAN.

In some implementations, the first AP may send a coordinated downlink (CO-DL) parameter to the second AP. The CO-DL parameter may be included in a MAP-Sch-Trigger message that is used to provide the resource assignments to neighboring APs. The neighboring APs (such as the second AP) may use the CO-DL parameter to determine whether to utilize the coordinated transmission. In some implementations, the first AP also may cause its intended downlink STAs (such as the first STA) to transmit a test communication that can be used by the first AP and the neighboring APs to determine signal strength or path loss. The neighboring APs may measure a signal strength of the test communication from the first STA. The neighboring AP also may estimate an amount of transmit power for it to communicate an OBSS downlink communication to the OBSS STA as part of the coordinated transmission. The neighboring AP may participate in the coordinated transmission after a determination that the estimated transmit power for the OBSS downlink communication is below a limit. The limit may be determined using the signal strength of the test communication from the first STA and the CO-DL parameter.

Particular implementations of the subject matter described in this disclosure can be implemented to realize one or more of the following potential advantages. A first AP (as TXOP owner) of a first WLAN may share a frequency portion (as a resource assignment) of a TXOP with a second AP (a neighboring AP) of a second WLAN for a coordinated transmission during a portion of the TXOP. The second AP can use the resource assignment if doing so would not interfere with the first AP's use of the TXOP. Thus, the TXOP owner is not penalized for sharing part of the TXOP, while the use of coordinated transmissions can improve the spectral efficiency of the wireless channel. Furthermore, in some implementations, the use of coordinated transmissions can be enabled without direct management or backhaul coordination by different WLANs that share the wireless channel. The use of a CO-UL parameter or a CO-DL parameter may represent a concise metric that provides sufficient information for the second AP or STAs in the second WLAN to determine whether to participate in the coordinated transmission.

FIG. 1A shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1A additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 1B:
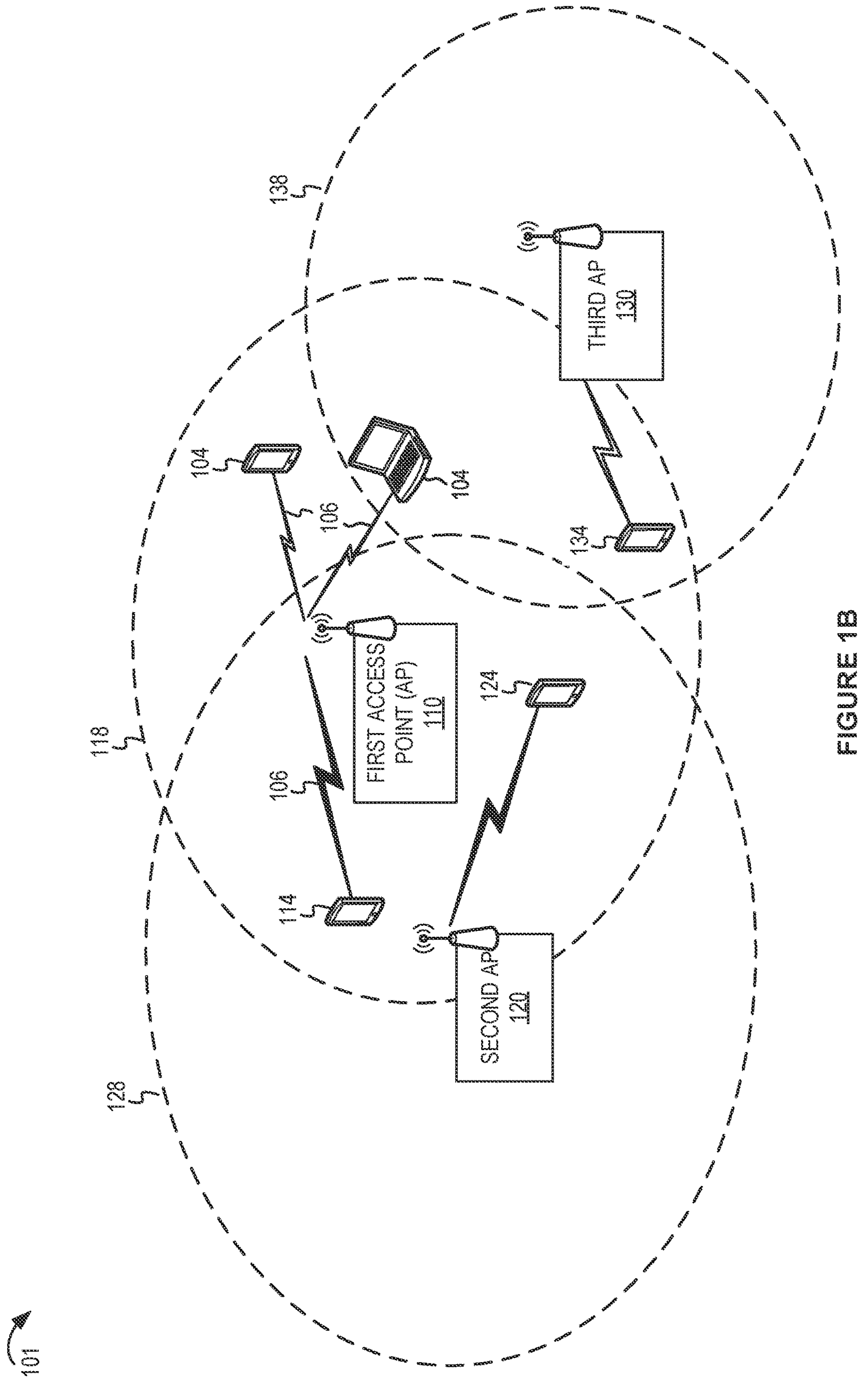
FIG. 1B shows a pictorial diagram of multiple wireless local area networks (WLANs) that may use coordinated transmissions.

FIG. 1B shows a pictorial diagram of multiple WLANs that may use coordinated transmissions. FIG. 1B includes a system diagram 101 of an environment that has more than one WLAN operating overlapping coverage areas. A first WLAN may be managed by a first AP 110 that establishes a first BSS. Similarly, a second first WLAN may be managed by a second AP 120 that establishes a second BSS and a third WLAN may be managed by a third AP 130 that establishes a third BSS. Each of the APs 110, 120, and 130 may be similar to the AP 102 described in FIG. 1A. Each WLAN may be a network implementing at least one of the IEEE 802.11 family of standards (such as that defined by the IEEE 802.11-2016 specification or amendments thereof). Each WLAN may provide access to other networks (not shown). For example, the AP 110 may be connected to a gateway device (not shown) which provides connectivity to another network (not shown). Each WLAN may include numerous wireless communication devices such as an AP and multiple STAs. In the example of FIG. 1B, the first AP 110 may have multiple STAs 104 and 114 that have a wireless association with the first AP 110. While the first AP 110 is described as an access point using an infrastructure mode, in some implementations, the first AP 110 may be a STA which is operating as an AP. For example, the first AP 110 may be a STA capable of operating in a peer-to-peer mode or independent mode. In other examples, the first AP 110 may be a software AP (SoftAP) operating on a computer system.

A single AP and its associated STAs may be referred to as a basic service set (BSS), which is managed by the respective AP. In the example of FIG. 1B, the first BSS includes the first AP 110 and a first STA 114. The second BSS includes the second AP 120 and a second STA 124. The third BSS includes the third AP 130 and a third STA 134. It is noted that the locations of the STAs 104, 114, 124, 134 in FIG. 1B are arbitrarily illustrated as an example. The STAs 104, 114, 124, 134 may have different positions in relation to their associated APs. The STAs 104, 114, 124, 134 may be mobile and change position over time. As shown in FIG. 1B, the associated STA may be closer to a different AP than the AP to which it is associated. For example, the first STA 114 may be closer to the second AP 120 even though the first STA 114 is wirelessly associated with the first AP 110. An "unassociated STA" may not be considered part of the BSS because they do not have a wireless session established at the AP. The BSS is identified by a service set identifier (SSID) that is advertised by the AP. The various STAs in the WLAN can communicate with external networks as well as with one another via the AP 110 and respective communication links 106.

FIG. 1B additionally shows example coverage areas associated with each AP. For example, a first coverage area 118 of the AP 110, which may represent a basic service area (BSA) of the first WLAN. An example second coverage area 128 of the second AP 120 may form a BSA of the second WLAN and an example third coverage area 138 of the 130 may form a BSA of the third WLAN. As a result of the increasing ubiquity of wireless networks, a STA may have the opportunity to select one of many BSSs within range of the STA or select among multiple APs that together form an extended service set (ESS) including multiple connected BSSs.

In the example of FIG. 1B, the APs 110, 120, and 130 may be configured to use a same wireless channel. For example, the first BSS, the second BSS, and the third BSS may be referred to as overlapping BSSs (OBSSs) because they are configured for the same wireless channel in the same location. Traditionally, the APs may share the wireless channel using either a time-based division of the wireless channel or by obtaining access through a contention-based procedure. For example, channel access may use orthogonal frequency division multiplexing (OFDM). In newer WLAN communications technologies, orthogonal frequency division multiple access (OFDMA) may provide more efficient use of a wireless channel. OFDMA is further described in FIG. 2B. OFDMA refers to the ability to subdivide a wireless channel into resource units that can be assigned to different WLAN devices.

In a contention-based procedure, the WLAN devices (such as the APs 110, 120, and 130) may determine if the wireless channel is available and may win a contention for an upcoming transmission opportunity (TXOP). Following a traditional contention-based procedure, the TXOP would be exclusively reserved for the WLAN device that wins the contention for channel access. For example, the first AP 110 may win the contention for the next TXOP. The first AP 110 may be referred to as a TXOP owner. In newer technologies, the APs may be configured to support coordinated transmissions on a wireless channel. Coordinated transactions refers to a technique in which multiple WLAN devices may concurrently transmit using sub-bands (or resource assignments) during a portion of the TXOP. The TXOP owner (such as the first AP 110) may allocate a resource assignment to another AP (such as the second AP 120). The resource assignment may be a sub-channel or frequency division resource unit (similar to OFDMA) from the wireless channel during a time for the coordinated transmission.

During a coordinated transmission, the first WLAN and the second WLAN may concurrently communicate using different resource assignments of a wireless channel. The use of coordinated transmissions may increase the spectral efficiency of the wireless channel. However, a potential risk of coordinated transmissions is that the second WLAN may cause cross-network interference to the first WLAN. For example, as described above, the first STA 114 may be closer to the second AP 120 than to the first AP 110 with which it is associated. If both the first AP 110 and the second AP 120 transmit downlink signals during the coordinated transmission, there is a potential that the downlink signals from the second AP 120 may cause interference that prevents the first STA 114 from properly receiving the downlink signals from the first AP 110. Similarly, for uplink signals, the first STA 114 and the second STA 124 may concurrently transmit uplink signals to the first AP 110 and the second AP 120, respectively. The second STA 124 may be closer to the first AP 110, and the coordinated transmission may inadvertently cause interference for the first AP 110 that prevents the first AP 110 from properly receiving the uplink signals from the first STA 114.

In the examples of this disclosure, the first WLAN (including the first AP 110 and the first STA 114) may be the TXOP owner. While the use of coordinated transmission may permit the first WLAN to share the wireless channel with another WLAN, it may be desirable to limit or prevent the second WLAN from participating in the coordinated transmission when doing so would cause interference to the first WLAN. Therefore, in some implementations, the first WLAN may conditionally provide the resource assignment so that the second WLAN only uses the resource assignment if it can do so without interfering with the first WLAN. For concurrent downlink coordinated transmission, the first AP 110 may communicate at least one parameter (referred to as a CO-DL parameter in this disclosure) to the second AP 120 that the second AP 120 can use to determine whether the resource assignment can be used without interfering with the second STA 124. For concurrent uplink coordinated transmission, the first AP 110 may communicate at least one parameter (referred to as a CO-UL parameter in this disclosure) to the second AP 120 that the second AP 120 can send to the second STA 124. The second STA 124 can use the CO-UL parameter to determine whether the resource assignment can be used without interfering with the first AP 110.

Figure 2:
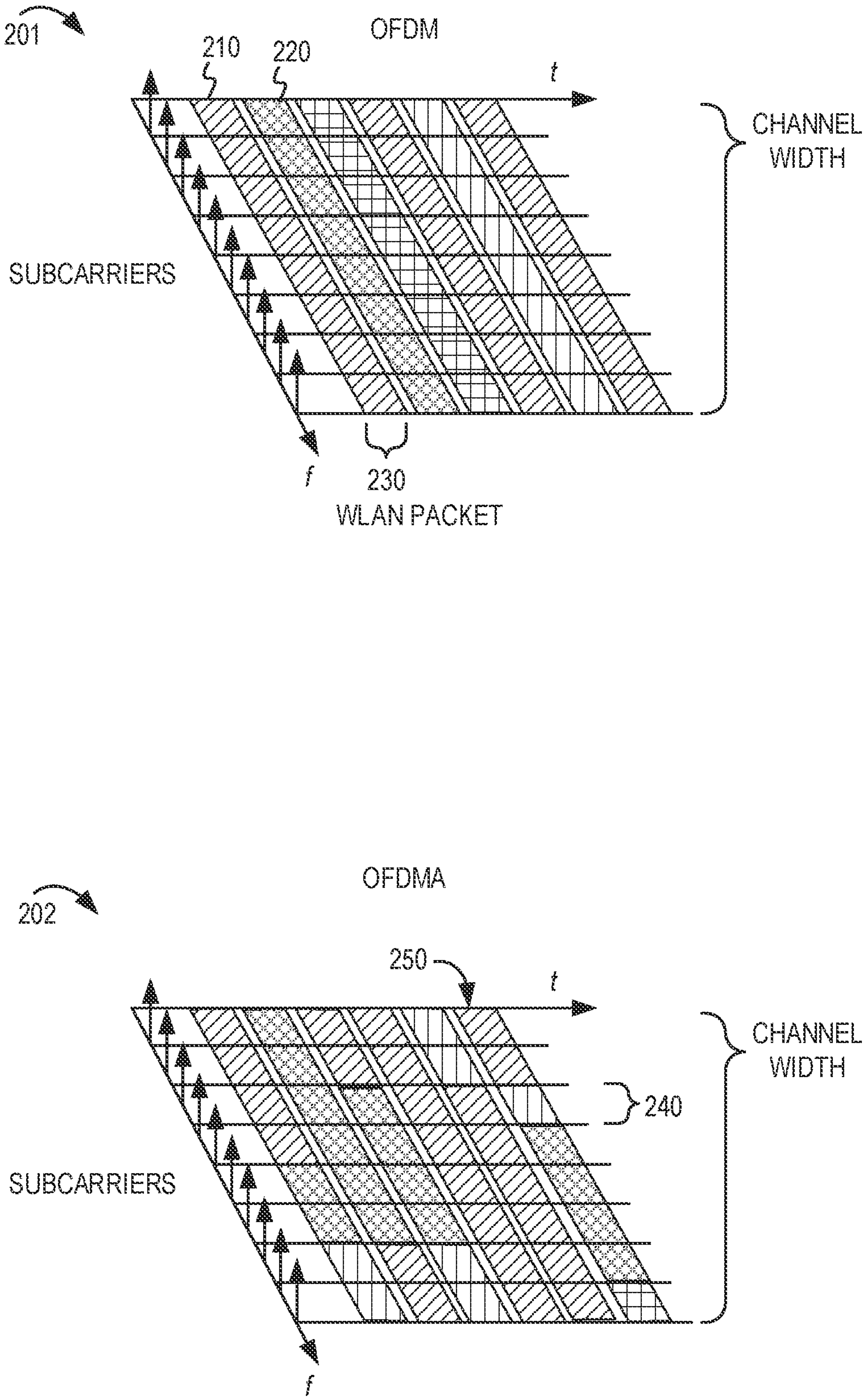
FIG. 2 shows conceptual diagrams of orthogonal frequency division multiplexing (OFDM) and orthogonal frequency division multiple access (OFDMA) to illustrate resource assignments of a wireless channel.

FIG. 2 shows conceptual diagrams of OFDM and OFDMA to illustrate resource assignments of a wireless channel. The top of FIG. 2 shows a conceptual diagram of OFDM 201. The OFDM channel width may include multiple subcarriers. A WLAN packet 230 (also referred to as a PPDU) includes data that is encoded using the subcarriers of the channel width. For example, a first STA may transmit a first PPDU 210 at a first time period. During a second time period, a second STA may transmit a second PPDU 220. The PPDUs 210 and 220 may be different lengths of time. Typically, the first STA and the second STA (and any other STAs in the BSS) will contend for access to the channel. Once the STA wins the contention, the STA can use the channel for transmission of a PPDU. As shown in FIG. 2A, different shading of the PPDUs indicates that different STAs may utilize the wireless channels sequentially, one at a time. However, this communication structure may be inefficient if a STA does not have enough data to justify using the full channel width. IEEE 802.11ax introduced the use of ODFMA in a WLAN.

The bottom of FIG. 2 shows a conceptual diagram of OFDMA 202. ODFMA breaks down the channel width into a plurality of resource units (RUs). Each RU may include a different quantity of subcarriers. Using OFDMA, an AP may allocate different RUs for different STAs. For example, a PPDU 250 may include different RUs allocated for a first STA, a second STA, a third STA, and a fourth STA. One RU 240 is allocated for a STA to transmit uplink data in the PPDU 250, while other RUs are allocated for different STAs. The allocation of RUs may be used to schedule channel access. For example, a trigger message from an AP may indicate which RUs are allocated to particular STAs to use for uplink traffic in the PPDU that follows the trigger message.

In accordance with this disclosure, the concept of scheduling resource assignments may be used with coordinated transmissions. For example, a TXOP owner (such as a first AP) may provide a resource assignment to a neighboring AP (such as a second AP). The neighboring AP may use the resource assignment to schedule RUs for OBSS STAs or may use the resource assignment for downlink transmissions. By using coordinated transmissions, both the first AP and the second AP may be able to transmit or receive wireless communications during the TXOP.

Figure 3:
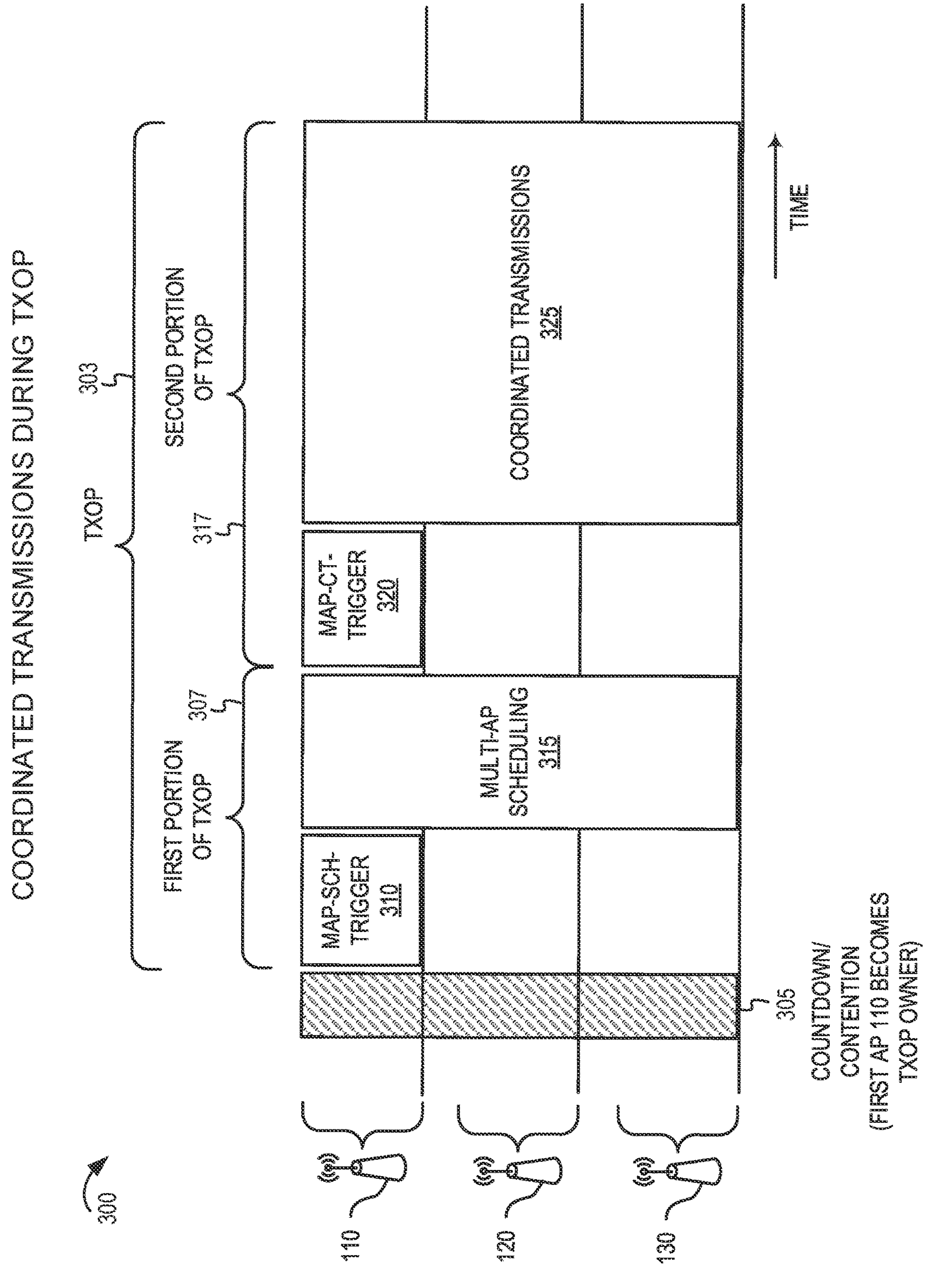
FIG. 3 illustrates an example of a multiple access point (multi-AP) coordination technique that supports coordinated transmission during a transmission opportunity (TXOP).

FIG. 3 illustrates an example of multi-AP coordination technique 300 that supports coordinated transmission during a TXOP 303. In this example, a first AP 110, a second AP 120, and a third AP 130 may perform coordinated transmissions 325. The example is based on a contention-based communication system. In some newer frequency bands (such as 6G), the wireless channel may be scheduled by a semi-permanent TXOP owner that is delegated or selected. Initially, in a contention-based procedure, the APs 110, 120, and 130 may contend for access to a wireless channel during a contention/countdown window 305. In this example, the first AP 110 may be the first to contend for channel access (such as according to an EDCA contention-based channel access procedure) and may win control of the TXOP. The first AP 110 may be referred to as a TXOP owner. In other systems, there may be other ways for the first AP 110 to become the TXOP owner for an upcoming TXOP. Regardless of how the first AP 110 becomes the TXOP owner for the wireless channel, the first AP 110 may be in control of scheduling resources during the TXOP.

Upon winning the contention-based channel access procedure, the first AP 110 may initiate a multi-AP scheduling phase during a first portion of the TXOP 307. In the example of FIG. 3, the first AP 110 may transmit a multi-AP scheduling trigger (which may be referred to as a MAP-Sch-Trigger 310 message). The MAP-Sch-Trigger 310 may be received by each of the second AP 120 and the third AP 130. The MAP-Sch-Trigger 310 may be a MAP PPDU that the first AP 110 transmits to initiate scheduling multi-AP communications. The second AP 120 and the third AP 130 may transmit one or more multi-AP scheduling 315 communications that may be received by one or more associated STAs, and that is also received by the first AP 110. The first AP 110, based on transmissions of the second AP 120 and the third AP 130, may determine wireless resources (such as frequency resources, time resources, or combinations thereof) that will be used for multi-AP communications in a second portion of the TXOP 317. The first AP 110 may then transmit a multi-AP coordinated transmission trigger message (which may be referred to as a MAP-CT-Trigger 320 message) to indicate the beginning of the second portion of the TXOP 317. The MAP-CT-Trigger 320 may indicate to each of the other APs 120 and 130 that the coordinated transmissions may follow. In some cases, the coordinated transmission 325 may include transmissions from all participating BSSs simultaneously within the second portion of the TXOP 317. Resources within the coordinated transmissions 325 may be allocated, as indicated above, based on time resources, frequency resources, or using coordinated OFDMA using orthogonal channels.

Figure 4:
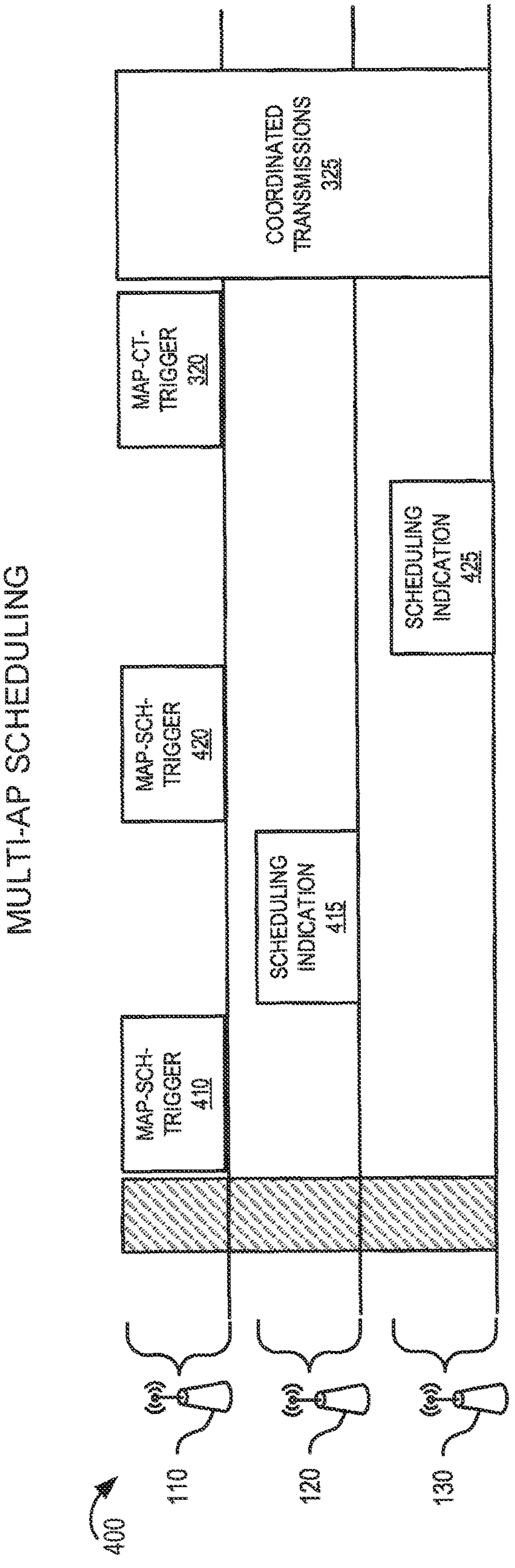
FIG. 4 illustrates an example of a multi-access point scheduling technique in a first portion of the TXOP.

FIG. 4 illustrates an example of a multi-access point scheduling technique 400 in a first portion of the TXOP. As with all the examples in this disclosure, the first AP 110 may be the TXOP owner for the upcoming TXOP. The first AP 110 may transmit a MAP-Sch-Trigger to each neighboring AP 120 and 130, one at a time, to initiate scheduling of multi-AP communications. The first AP 110 may send a first MAP-Sch-Trigger 410, which may be received by the second AP 120. The second AP 120, in this case, may transmit a scheduling indication 415 to its associated STAs, that also may be received by the first AP 110. The first AP 110 may then send a second MAP-Sch-Trigger 420, which may be received by the third AP 130. The third AP 130, in this case, may transmit a scheduling indication 425 to its associated STAs, that also may be received by the first AP 110. The first AP 110, based on the scheduling indications 415 and 425, may determine resources for transmissions of each AP 110, 120, and 130, and may transmit a MAP-Trigger 430 to initiate the coordinated transmissions 325.

In this example, only one neighboring AP is targeted at any time by the MAP-Sch-trigger 410 or 420 and the scheduling indications 415 and 425 will not interfere with each other. In some cases, the scheduling indications 415 and 425 may include a scheduling indication (SI) frame transmission that is sent by each neighboring AP 120, and 130 to its associated STAs. The first AP 110, as the TXOP Owner, monitors SI frames and may determine when to poll the next-in-line AP. Such a technique provides relatively simple scheduling for multi-AP communications, although time resources associated with multiple APs are consumed.

Figure 5:
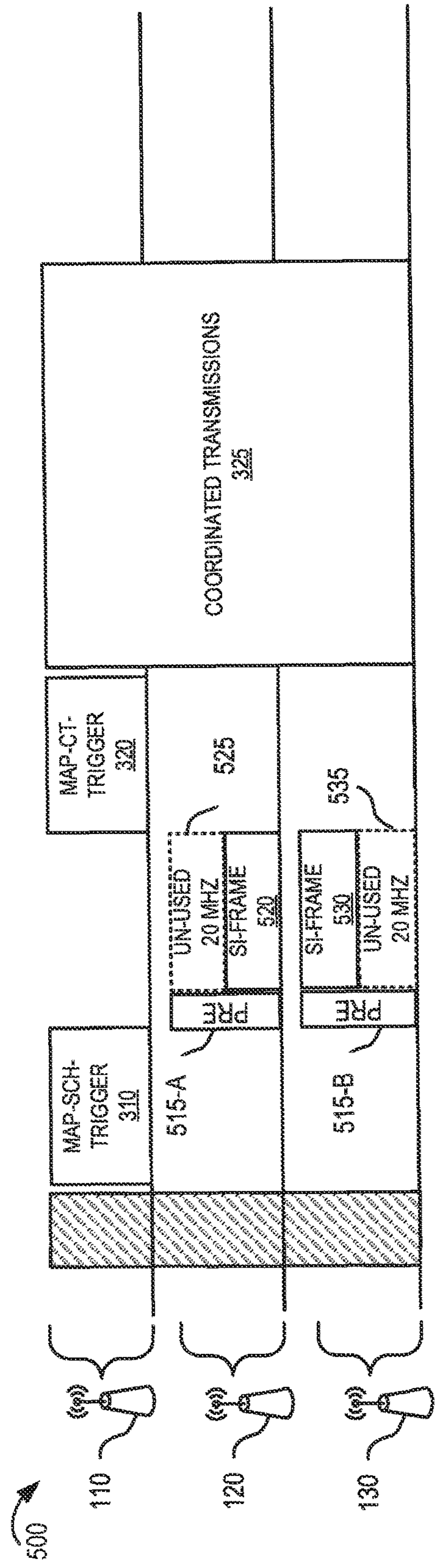
FIG. 5 illustrates an example of concurrent scheduling for multiple access points (APs) in a first portion of the TXOP.

FIG. 5 illustrates an example of a concurrent scheduling 500 for multiple APs in a first portion of the TXOP. In this example, first AP 110, second AP 120, and third AP 130 may perform coordinated transmissions in which concurrent scheduling of multiple APs 110, 120, and 130 may be implemented. As described previously, the first AP 110 may be the TXOP owner for the upcoming TXOP. The first AP 110 may transmit a MAP-Sch-Trigger 310 to initiate scheduling of multi-AP communications. The second AP 120 and the third AP 130, in this case, may concurrently transmit a scheduling indication.

In some cases, the scheduling indication may be provided in a MAP-PPDU from each of the second AP 120 and third AP 130. The subchannel used by each AP 120 and 130 for transmission of a SI frame may be derived from the MAP-Sch-Trigger 310. In the example of FIG. 5, the second AP 120 may transmit a scheduling indication that includes a preamble 515-*a*, and a SI-frame 520 that occupies a first sub-channel of multiple available subchannels (such as a first 20 MHz channel of multiple available 20 MHz channels). In this example, two subchannels are illustrated, and the second AP 120 has an unused second subchannel 525. Similarly, the third AP 130 may transmit a scheduling indication that includes a preamble 515-*b*, and a SI-frame 530 that occupies the second subchannel, leaving the first subchannel as an unused subchannel 535. Thus, the different SI frames 520 and 530 will not interfere with each other and can be concurrently transmitted, which may more efficiently use time and frequency resources.

In some cases, the MAP-Sch-Trigger 310 may be transmitted by the first AP 110, as the TXOP owner AP, to each of the other neighboring APs 120, and 130, and may trigger the other APs 120, and 130 to transmit the SI Frames 520 and 530, respectively. In some cases, the preambles 515-*a* and 515-*b* transmitted by each AP 120 and 130, respectively, may include an AP identifier (such as expressed using short BSSID or Color code, or a reserved or unique association ID (AID)) and an indication of a subchannel of the SI frame. In some cases, the preamble 515 and SI frames 520 and 530 may be formatted in a MAP-PPDU. Associated STAs of the different APs may, in some cases, determine the subchannel used by its AP 110, 120, and 130 by decoding the preamble 515, and each STA in the associated BSS may tune to the subchannel assigned for their respective AP 120 or 130, and all per-STA information may be carried within the SI frame (such as MAC information).

The first AP 110 may determine resources for transmissions of each AP 120 and 130, based on the SI frames 520 and 530. Following the multi-AP scheduling phase, the first AP 110 may transmit a MAP-CT-Trigger 320 to initiate the coordinated transmissions 325.

Figure 6:
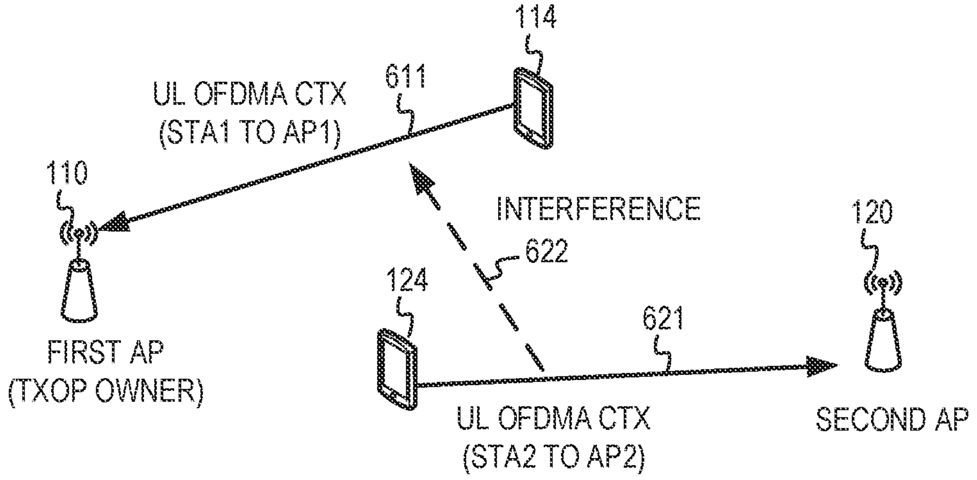
FIG. 6 illustrates an example of uplink coordinated transmissions in which interference may be a consideration.

FIG. 6 illustrates an example of downlink coordinated transmissions in which interference may be a consideration. As with other examples in this disclosure, the first AP 110 may be a TXOP owner for the TXOP represented in FIG. 6. The first AP 110 may provide a resource assignment for an OBSS to concurrently use a portion of the TXOP using coordinated transmissions. In this example, the first STA 114 may have uplink data to transmit (shown as a first uplink transmission 611) to the first AP 110. Similarly, the second STA 124 may have uplink data to transmit (shown as a second uplink transmission 621) to the second AP 120. Even though the first STA 114 and the second STA 124 are associated with different APs, using the coordinated transmission techniques in this disclosure, the uplink transmissions may be concurrently transmitted in different resource units of the wireless channel. For example, the first AP 110 may provide a resource assignment to the second AP 120 and the second AP 120 may schedule the second uplink transmission 621 in the resource assignment. However, the second uplink transmission 621 may cause interference 622 that prevents the first AP 110 from properly receiving the first uplink transmission 611. The interference 622 can be present even though the first uplink transmission 611 and the interference 622 may occupy different sub-bands or RUs of the wireless channel coordinated transmission. For example, the interference 622 may be more prominent when the second STA 124 is closer to the first AP 110 than the first STA 114 at the time of the coordinated transmission. Since the first AP 110 is the TXOP owner, it is desirable to protect the first uplink transmission 611 from the interference 622.

In accordance with an aspect of this disclosure, the first AP 110 may condition the use of the resource assignment based on an amount of the potential interference 622. The first AP 110 may communicate a parameter (the CO-UL parameter) to the second AP 120 which is further communicated to the second STA 124. The second STA 124 may use the CO-UL parameter to determine whether it can use the resource assignment without causing interference 622 above an amount that the first AP 110 can tolerate. As described further in FIG. 8, the second STA 124 may measure signal strength of a communication from the first AP 110 and use the measured signal strength with the CO-UL parameter to determine a maximum amount of transmit power (as an uplink power limit for the second STA 124) that the second STA 124 can use for the second uplink transmission 621. The second STA 124 further can determine an estimated transmit power for the second uplink transmission 621 to enable the second uplink transmission 621 to be decoded properly by the second AP 120. If the estimated transmit power is lower than the uplink power limit, then the second STA 124 may proceed with transmitting the second uplink transmission 621. However, if the estimated transmit power is higher than the uplink power limit, then the second STA 124 may determine that transmitting the second uplink transmission 621 would cause too much interference 622 for the first AP 110 to properly receive the first uplink transmission 611. In this scenario, the second STA 124 may refrain from using the resource assignment.

Figure 7:
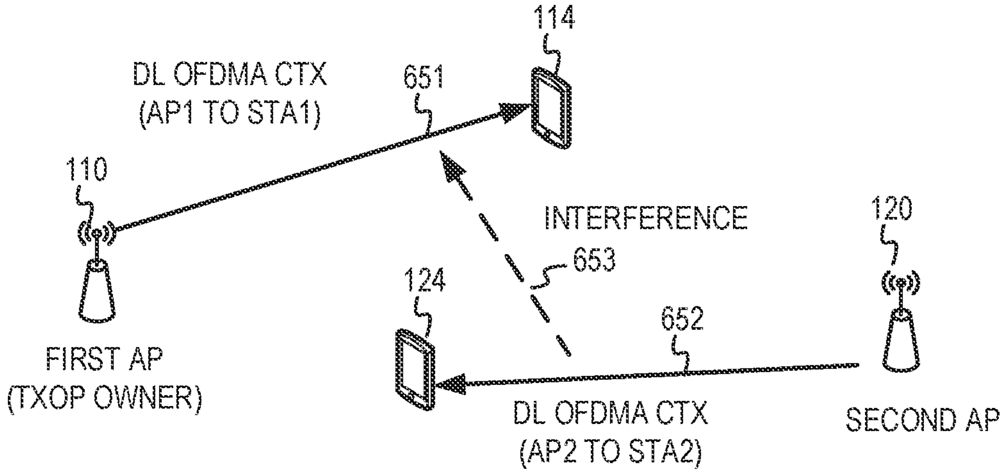
FIG. 7 illustrates an example of downlink coordinated transmissions in which interference may be a consideration.

FIG. 7 illustrates an example of downlink coordinated transmissions in which interference may be a consideration. As with other examples in this disclosure, the first AP 110 may be a TXOP owner for the TXOP represented in FIG. 7. The first AP 110 may provide a resource assignment for an OBSS to concurrently use a portion of the TXOP using coordinated transmissions. In this example, the first AP 110 may have downlink data to transmit (shown as a first downlink transmission 651) to the first STA 114. Similarly, the second AP 120 may have downlink data to transmit (shown as a second downlink transmission 652) to the second STA 124. Using the coordinated transmission techniques in this disclosure, the downlink transmissions may be concurrently transmitted in different resource units of the wireless channel. For example, the first AP 110 may provide a resource assignment to the second AP 120 and the second AP 120 may schedule the second downlink transmission 652 in the resource assignment. However, the second downlink transmission 652 may cause interference 653 that prevents the first STA 114 from properly receiving the first downlink transmission 651. The interference 653 can be present even though the first downlink transmission 651 and the interference 653 may occupy different sub-bands or RUs of the wireless channel coordinated transmission. For example, the interference 653 may be more prominent when the first STA 114 is closer to the second AP 120 than the first AP 110 at the time of the coordinated transmission. Since the first AP 110 is the TXOP owner, it is desirable to protect the first downlink transmission 651 from the interference 653.

In accordance with an aspect of this disclosure, the first AP 110 may condition the use of the resource assignment based on an amount of the potential interference 653. The first AP 110 may communicate a parameter (the CO-DL parameter) to the second AP 120. The second AP 120 may use the CO-DL parameter to determine whether it can use the resource assignment without causing interference 653 above an amount that the first AP 110 can tolerate. In some implementations, the first AP 110 also may cause the first STA 114 (or any other target STAs for which is has downlink traffic to send) to send a test communication. The test communication may be a null packet, a quality of service null frame, or a newly defined type of frame for test communications. For example, the first AP 110 may send a null packet request trigger frame to the first STA 114 to cause the first STA 114 to send the test communication. The second AP 120 may obtain an RSSI measurement associated with the test communication from the first STA 114 even though the first STA 114 belongs to a first BSS different from the second AP 120. Using the RSSI measurement of the test communication and the CO-DL parameter, the second AP 120 may determine a maximum amount of transmit power (as a downlink power limit for the second AP 120) that the second AP 120 can use for the second uplink downlink transmission 652. The second AP 120 further can determine an estimated transmit power for the second uplink downlink transmission 652 to enable the second uplink downlink transmission 652 to be decoded properly by the second STA 124. If the estimated transmit power is lower than the downlink power limit, then the second AP 120 may proceed with transmitting the second uplink downlink transmission 652. However, if the estimated transmit power is higher than the downlink power limit, then the second AP 120 may determine that transmitting the second uplink downlink transmission 652 would cause too much interference 653 for the first STA 114 to properly receive the first downlink transmission 651. In this scenario, the second AP 120 may refrain from using the resource assignment.

Figure 8:
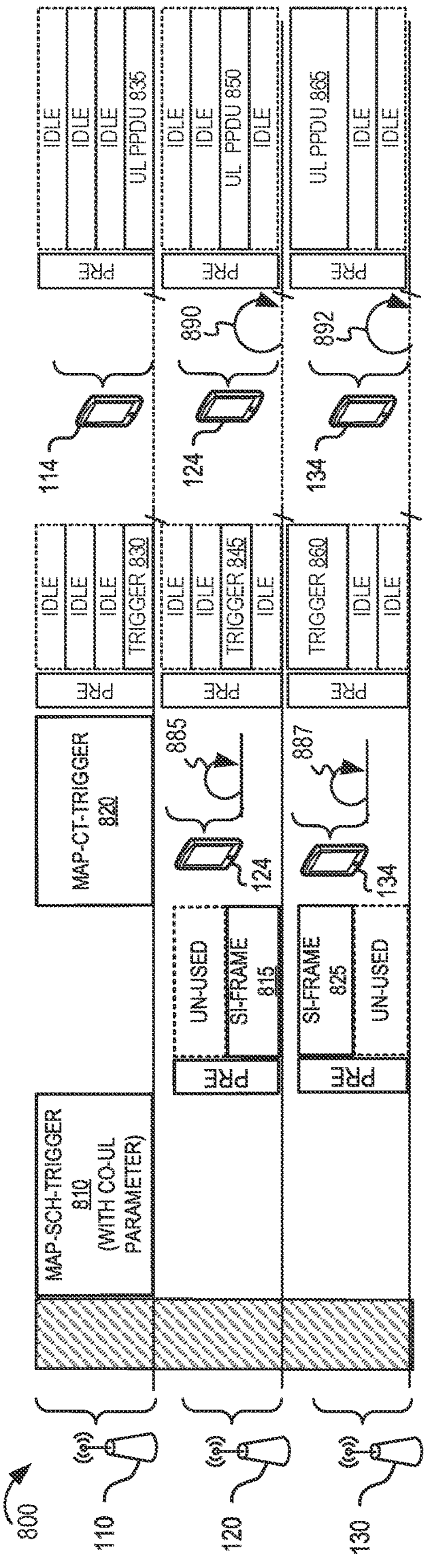
FIG. 8 illustrates an example of a protocol sequence for uplink OFDMA that supports uplink coordinated transmissions.

FIG. 8 illustrates an example of a protocol sequence 800 for uplink OFDMA that supports uplink coordinated transmissions. In this example, first AP 110, second AP 120, and third AP 130 may perform uplink coordinated transmissions. Because the first AP 110 is the TXOP owner for this example, the first AP 110 may transmit a scheduling trigger such as a MAP-Sch-Trigger 810, which may be received by the second AP 120 and the third AP 120. The MAP-Sch-Trigger 810 may include the CO-UL parameter as a variable that can be used by the OBSS STAs to determine an uplink power limit. The example of FIG. 8 depicts concurrent scheduling of multiple APs as described in FIG. 5. Other implementations may use sequential scheduling. The second AP 120 and the third AP 130, in this case, may perform multi-AP scheduling according to any one of the examples discussed herein. For example, the second AP 120 and the third AP 130 may send SI Frames 815 and 825 to their respective BSSs. In this example, the SI Frames 815 and 825 may include the CO-UL parameter. For example, the second AP 120 may obtain the CO-UL parameter from the MAP-Sch-Trigger 810 and transmit the CO-UL parameter to its STAs that need to transmit uplink data. After the multi-AP scheduling phase, the first AP 110, based on the multi-AP scheduling may determine resources for uplink transmissions from OBSS STAs to of each the neighboring APs 120 and 130. To initiate the uplink coordinated transmissions, the first AP 110 may transmit a MAP-CT-Trigger 820 message. The OBSS STAs may measure the RSSI of the MAP-CT-Trigger 820 to determine a variable in a power limit calculation as described further below. For example, the second STA 124 may perform an RSSI measurement 885 regarding the MAP-CT-Trigger 820. In some implementations, the SI Frames 815 and 825 may include an AP identifier (such as expressed using short BSSID or Color code, or a reserved or unique AID) associated with the first AP 110. For example, the second AP 120 may include a color code of the first AP 110 to assist its STAs (such as the second AP 120) to identify the MAP-CT-Trigger 820 and obtain the RSSI measurement 885. The third STA 134 may perform a similar process (shown as RSSI measurement 887).

Following the MAP-CT-Trigger 820, the APs 110, 120, and 130 may trigger the uplink coordinated transmissions. In this example, multi-AP coordinated transmission may use OFDMA to provide concurrent transmissions of multiple APs 110, 120, and 130 and STAs, and uplink transmissions of the STAs may be triggered by a corresponding trigger (shown as triggers 830, 845, 860) from their respective AP. In this example, the first AP 110 may transmit preamble that spans several subchannels, and trigger 830 using a first subchannel (such as a primary 20 MHz channel), while remaining subchannels are idle. The trigger 830 may trigger the corresponding STA(s) (such as the first STA 114) to transmit an UL PPDU 835 in the first subchannel, while remaining subchannels are idle. The second AP 120 may transmit a preamble that spans several subchannels, and trigger 845 using a second subchannel (such as a secondary 20 MHz channel), while remaining subchannels are idle. The trigger 845 may trigger the corresponding STA(s) (such as the second STA 124) to transmit an UL PPDU 850 in the second subchannel, while remaining subchannels are idle. The third AP 130 may transmit a preamble that spans several subchannels, and a trigger 860 using a third subchannel (such as a secondary 40 MHz channel), while remaining subchannels are idle. The trigger 860 may trigger the corresponding STA(s) (such as the third STA 134) to transmit an UL PPDU 865 in all or a portion of the third subchannel, while remaining subchannels are idle. In some examples, the UL PPDUs on different subchannels may end at different times. In this example, the first AP 110, as the TXOP owner, may indicate the sub-channel for each neighboring AP 120 and 130.

Following the trigger from the first AP 110, the first STA 114 may proceed with its UL coordinated transmission. However, as described above, the second STA 124 and the third STA 134 may determine whether to proceed (or refrain) from transmitting the UL PPDU 850 and the UL PPDU 865, respectively, based on whether those UL transmissions would exceed an uplink power limit. The uplink power limit can be calculated using the CO-UL parameter and the RSSI measurement 885 associated with the first AP 110.

Below is an example of how the CO-UL parameter may be calculated. The calculation is based on determining the maximum interference ($I_1$) that the first AP 110 can allow on its idle RU from a neighboring BSS without compromising its ability to properly receive an UL transmission from the first STA 114. The maximum interference ($I_1$) is based on the amount of transmit power the second STA 124 reduced by an amount of path loss between the second STA 124 and the first AP 110.

$$I_1 = T_2 - PL_{12}, \quad (1)$$

where $T_2$ represents the Tx Power of the second STA 124 (for its UL transmission), and $PL_{12}$ represents the path loss from the second STA 124 to the first AP 110.

The path loss from the second STA 124 to the first AP 110 can be represented as the following formula:

$$PL_{12} = TA_1 - R_{12}, \quad (2)$$

where $TA_1$ represents the transmit power of the first AP 110 (for the MAP-CT-Trigger frame), and $R_2$ represents the received power of the first AP 110 measured by second STA 124 (based on the RSSI measurement 885 for MAP-CT-Trigger frame).

Combining the formulas (1) and (2), the equation for the maximum interference ($I_1$) may be represented as:

$$\text{So, } I_1=T_2-(TA_1-R_{12}). \quad (3)$$

The second STA 124 may already know the $T_2$ (because it is related to the Tx power of the second STA 124). The first AP 110 may reorganize the equation to prepare the CO-UL parameter based on the other variables that are known by the first AP 110:

$$T_2=(TA_1-R_{12})+I_1 \quad (4)$$

$$T_2=(TA_1+I_1)-R_{12}) \quad (5)$$

Since the first AP 110 knows both $TA_1$ and $I_1$, it can calculate the CO-UL parameter based on those values.

$$\text{CO-UL parameter}=(TA_1+I_1) \quad (6)$$

The value of $R_{12}$ represents the received power of the first AP 110 measured by second STA 124 (based on the RSSI measurement 885 for MAP-CT-Trigger frame). Therefore, the second STA 124 may measure that value.

Using the CO-UL parameter and the $R_{12}$, the second STA 124 can determine the uplink power limit (CO-UL parameter$-R_{12}$).

At process 890, the second STA 124 may determine the uplink power limit and the transmit power needed by the second STA 124 to communicate with the second AP 120. If the transmit power of the second STA 124 is below the uplink power limit (for example, $T_2$<CO-UL parameter$-R_{12}$), then the second STA 124 may proceed with the uplink coordinated transmission using the resource assignment. Other STAs (such as the third STA 134) may perform a similar independent determination (such as process 892) to determine whether to use the resource assignment.

Figure 9:
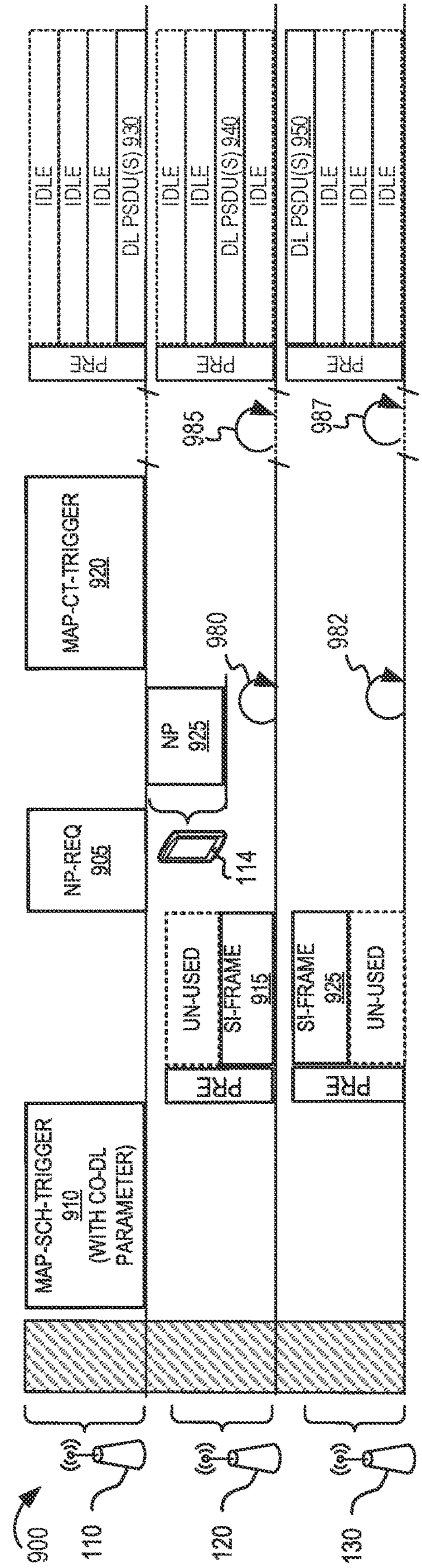
FIG. 9 illustrates an example of a protocol sequence for downlink OFDMA that supports downlink coordinated transmissions.

FIG. 9 illustrates an example of a protocol sequence 900 for downlink OFDMA that supports downlink coordinated transmissions. In this example, first AP 110, second AP 120, and third AP 130 may perform downlink coordinated transmissions. Because the first AP 110 is the TXOP owner for this example, the first AP 110 may transmit a scheduling trigger such as a MAP-Sch-Trigger 910. The MAP-Sch-Trigger 910 may include the CO-DL parameter as a variable that can be used by the OBSS APs to determine a downlink power limit. The MAP-Sch-Trigger 910 may be received by the second AP 120 and the third AP 130. The MAP-Sch-Trigger 910 may initiate a scheduling phase of multi-AP communications. The example of FIG. 8 depicts concurrent scheduling of multiple APs as described in FIG. 5. Other implementations may use sequential scheduling. The second AP 120 and the third AP 130, in this case, may perform multi-AP scheduling according to any one of the examples discussed herein. For example, the second AP 120 and the third AP 130 may send SI Frames 915 and 925 to their respective BSSs. In this example, the SI frames 915 and 925 may indicate downlink resources for each of the second AP 120 and the third AP 130, respectively.

In this example, the first AP 110, as the TXOP owner, may indicate the sub-channel for each neighboring AP 120 and 130. Such an indication may be provided in MAP-Sch-Trigger 910, and the second AP 120 and third AP 130 may use the allocated subchannel to serve their STAs. In some cases, the subchannel used for data communications may be different from a subchannel that is assigned to send an SI frame during Multi-AP scheduling phase in examples that provide concurrent transmissions of SI frames. In some cases, each neighboring AP may select the STAs that will be served during a coordinated OFDMA phase and may provide an indication of the selected STAs using an SI frame (the first AP 110 may not be aware of the list of selected STAs). In some examples, as part of multi-AP scheduling, the second AP 120 and third AP 130 may transmit SI frames to STAs that are selected to be served during coordinated OFDMA, and the assigned RU within the sub-channel that the AP is assigned by the first AP 110 as the TXOP owner. In some cases, the first AP 110 may assign the subchannel for coordinated OFDMA transmissions using MAP-Sch-Trigger 910 frame.

In this example, coordinated OFDMA transmissions are initiated in response to the MAP-CT-Trigger 920. The MAP-CT-Trigger 920 may provide scheduling information for coordinated OFDMA, which may include sub-channel assignment for each of the participating APs 110, 120, and 130 for use in transmitting the uplink coordinated transmissions. In some cases, sub-channel assignments may be provided in the MAP-scheduling-trigger 910, and the assignments may carry over to the coordinated OFDMA communications. In other cases, the first AP 110 may assign the sub-channel at the time of scheduling so that resources can be allocated more efficiently. In this example, multi-AP coordinated transmission may use OFDMA to provide concurrent transmissions of multiple APs 120, and 130. In this example, the first AP 110 may transmit a preamble that spans several subchannels, and DL PSDU(s) 930 using a first subchannel (such as a primary 20 MHz channel), while remaining subchannels are idle. The second AP 120 may transmit a preamble that spans several subchannels, and PSDU(s) 940 using a second subchannel (such as a secondary 20 MHz channel), while remaining subchannels are idle. Likewise, the third AP 130 may transmit a preamble that spans several subchannels, and PSDU(s) 950 using a third subchannel (such as a secondary 40 MHz channel), while remaining subchannels are idle.

As described in FIG. 7, there is a potential for the coordinated transmissions (such as the DL PSDU(s) 940 or the DL PSDU(s) 950) to interfere with the downlink transmissions from the first AP 110 to the first STA 114. Therefore, the second AP 120 and the third AP 130 may determine whether to transmit the DL PSDU(s) 940 and the DL PSDU(s) 950 based on whether those transmissions would cause interference above a threshold amount. The CO-DL parameter included in the MAP-Sch-Trigger 910 may be a value calculated by the first AP 110 for use by the second AP 120 and the third AP 130 to determine an uplink power limit. For example, the downlink power limit can be calculated using the CO-DL parameter and an RSSI measurement 980 associated with a test communication from the first STA 114. For example, if the first AP 110 has downlink traffic for the first STA 114, the first AP 110 may facilitate a test communication from the first STA 114 that can be detected and measured by the second AP 120 and the third AP 130. The first AP 110 may transmit a null packet request (such as the NP-REQ 905) to the first STA 114. In response to the NP-REQ 905, the first STA 114 may transmit a test communication (such as the null packet, NP 925). The second AP 120 may detect the SI frames 925 and obtain an RSSI measurement 980. The RSSI measurement 980 may be variable that, together with the CO-DL parameter, can be used by the second AP 120 to determine a downlink power limit for its downlink coordinated transmission (such as the DL PSDU(s) 940). The third AP 130 may perform a similar process (shown as RSSI measurement 982).

Below is an example of how the CO-DL parameter may be calculated. The calculation is based on the transmission powers of the first AP 110 and the neighboring APs and path loss between the first STA 114 and the neighboring APs. The CO-DL parameter can be calculated as a variable input that can be used by each neighboring AP along with their independent RSSI measurements 980, 982 regarding the first STA 114. The CO-DL parameter is premised with an initial formula that describes a goal for the transmit power of the first AP 110 to be more than the transmit power of the neighboring AP plus a margin to accommodate for interference. The initial goal may be represented by formula (7):

$$(T_1-PL_1)>(T_2-PL_2)+K, \quad (7)$$

Where $T_1$ represents a Tx power of the first AP 110 for the DL coordinated transmission it needs to send to the first STA 114, $T_2$ represents the Tx power of the second AP 120 for the DL coordinated transmission to one of the STAs associated with the second AP 120, $PL_1$ represents a path loss from the first AP 110 to the first STA 114, $PL_2$ represents a path loss from the second AP 120 to the first STA 114, and K represents a margin that the TXOP Owner determines. The margin may be statically or dynamically determined. For example, the value for K may be dynamically be determined based on a history of channel quality associated with the wireless channel. Alternatively, the value for K may be system-configured, user-configured, or manufacturer-configured.

The initial goal formula (7) may be reorganized to isolate the $T_2$, which is a value the first AP 110 may not know, but which is known by the second AP 120.

$$T_2<T_1-(PL_1-PL_2)-K \quad (8)$$

The metrics for path loss may be reduced to values based RSSI measurements associated with the SI frames 925 from the first STA 114:

$$PL_1-PL_2=(T_s-PL_2)-(T_s-PL_1)=Rx_2-Rx_1 \quad (9)$$

where $T_s$ represents the Tx power of SI frames 925 by the first STA 114, $R_1$ represents the Rx power of SI frames 925 measured by the first AP 110, and $Rx_2$ represents the Rx power of SI frames 925 measured by the second AP 120.

Replacing the path loss variables in formula (8) with the equivalent variables in formula (9), the goal formula can be written as formula (10) and reorganized as formula (11):

$$T_2<T_1-(Rx_2-Rx_1)-K \quad (10)$$

$$T_2<(T_1+Rx_1-K)-Rx_2 \quad (11)$$

Since the first AP 110 knows the values of $T_1$, $Rx_1$, and K, it can calculate the CO-DL parameter based on those values.

$$\text{CO-DL}=(T_1+Rx_1-K) \quad (12)$$

In some implementations, the first AP 110 can send the CO-DL parameter in the MAP-CT-Trigger 920. Alternatively, it is possible for the first AP 110 to calculate the CO-UL parameter before the MAP-Sch-Trigger 910 and include the CO-UL parameter in the MAP-Sch-Trigger 910. For example, the first AP 110 may facilitate a test communication (the SI frames 925) before beginning the multi-AP scheduling phase.

At process 985, the second AP 120 may determine the downlink power limit based on the RSSI measurement 980 for the SI frames 925 and the transmit power needed by the second AP 120 to communicate with the second STA 124. If the transmit power of the second AP 120 is below the downlink power limit (for example, $T_2$<CO-DL parameter−$Rx_1$), then the second AP 120 may proceed with the downlink coordinated transmission using the resource assignment. Otherwise, the second AP 120 may refrain from using the resource assignment. Other APs (such as the third AP 130) may perform a similar independent determination (such as process 987) to determine whether to use their resource assignment.

Figure 10A:
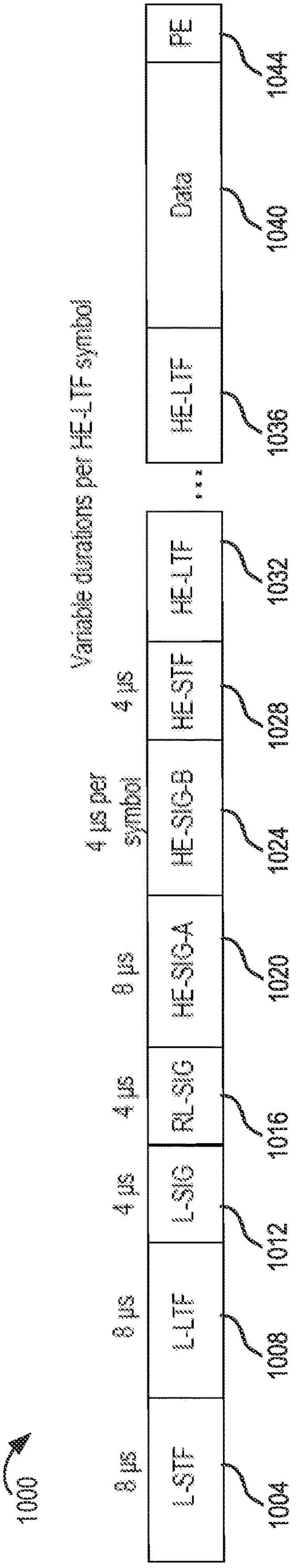
FIG. 10A illustrates an example of a multi-AP physical protocol data unit.

FIG. 10A illustrates an example of a multi-AP physical protocol data unit (MAP PPDU) 1000. In this example, the MAP PPDU 1000 may reuse a format of the defined HE MU PPDU, which may include a L-STF field 1004, a L-LTF field 1008, a L-SIG field 1012, a RL-SIG field 1016, a HE-SIG-A field 1020, a HE-SIG-B field 1024, HE-STF field 1028, one or more HE-LTF fields 1032 through 1036, a data portion 1040, and packet extension (PE) field 1044. In this example, the MAP PPDU 1000 may use the STAID fields of HE-SIG-B field 1024 to carry an identifier of each neighboring AP (such as determined from a short BSSID, a color-code, or a reserved or unique AID value of the APs).

In some case, STA-ID field of HE-SIG B 1024 may carry the AID of a STA. In some cases, for coordinated re-use, the STA-ID may be overloaded to carry a BSS identifier of the AP, such that STAs associated with that BSS decode the corresponding resource unit. In some cases, one or more fields in the HE-SIG-A 1020 may indicate if HE-SIG-B field 1024 has an alternate interpretation. For example, by setting the BSS Color field in SIG-A to a reserved or unique value (such as color=63). In other examples, UL Flag in SIG-A may be used (which in legacy system may be set to 1 when STA UL to AP, set to 0 when AP DL to STA, and in both cases the STA-ID may be set to the AID of intended STA, thus a transmitting AP will not set UL to 1). For example, APs may set UL to 1 in the MU PPDU to indicates that STA-ID carries BSS identifiers. The BSS identifier may be set to, for example, a random AID value picked by each AP and advertised in the AP's beacon to inform associated STAs, derived based on the BSSID of the AP (such as STAs derive by applying a hash function to the BSSID), or a BSS color indication.

Figure 10B:
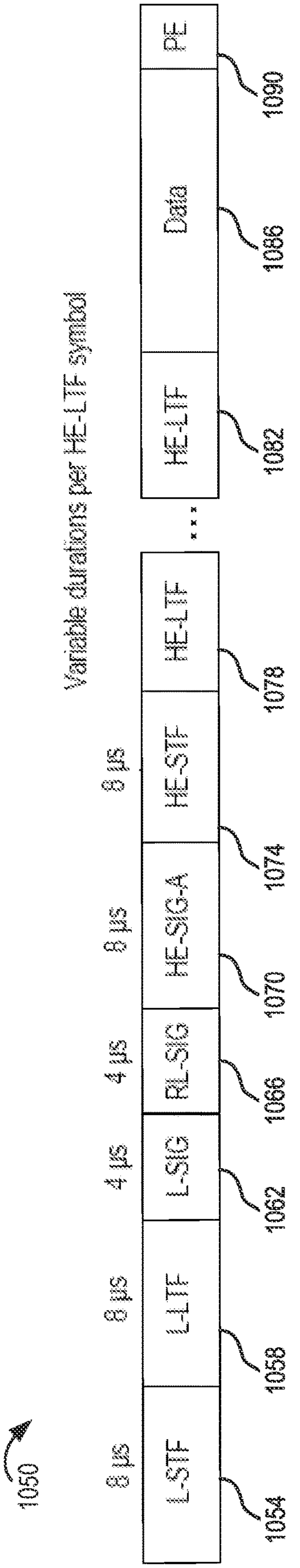
FIG. 10B illustrates another example of a multi-AP physical protocol data unit.

FIG. 10B illustrates another example of a multi-AP physical protocol data unit 1050. In this example, the MAP PPDU 1050 may modify a format of the defined HE TB PPDU, which may include a L-STF field 1054, a L-LTF field 1058, a L-SIG field 1062, a RL-SIG field 1066, a HE-SIG-A field 1070, a HE-STF field 1074, one or more HE-LTF fields 1078 through 1082, a data portion 1086, and packet extension (PE) field 1090. In this example, the MAP PPDU 1050 may have a new field defined (such as HE-SIG-C) to the preamble to carry the mapping of AP identifier to the subchannel. In other examples, the MAP PPDU 1050 may reuse the HE TB PPDU by reusing certain reserved/unused fields. For example, Spatial Reuse fields of the HE-SIG-A may be used for carrying the AP identifier and subchannel mapping. In further examples, a new EHT PPDU format may be defined to that provides information as discussed for MAP PPDUs. For example, SR bits in the HE-SIG-A field 1070 may be used to provide coordinated transmission information. In such cases, 25+1 of 25+1 bits are available, and may be used to carry information such as an indication of a new interpretation of SIG-A (1-bit) (such as bit 23) BSS Color (such as 6-bits per BSS), or sub-channels available for re-use (16-bits, with 1 bit for each 20 MHz of a 320 MHz BW).

In some cases, to ensure that HE-SIG-A and HE-SIG-B fields sent by all APs are the same, the TXOP Owner AP may sends the contents of the HE SIG-A, HE-SIG-BA to the neighboring APs implicitly or explicitly and may set the BSS color in HE-SIG-A to a single value (color 0, for example).

Figure 11:
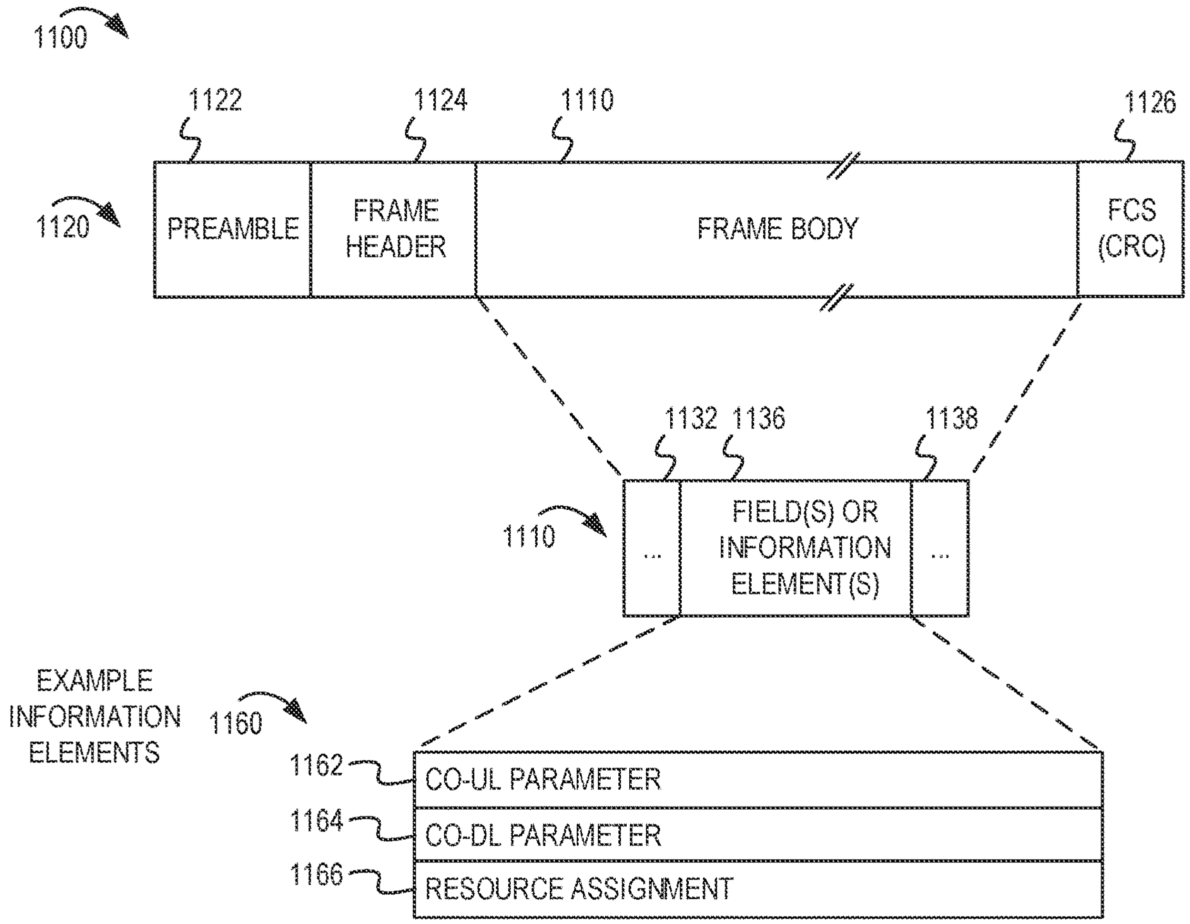
FIG. 11 shows a conceptual diagram of an example message format for communicating one or more parameters for coordinated transmissions.

FIG. 11 shows a conceptual diagram of an example message format for communicating one or more parameters for coordinated transmissions. For example, the message may be sent from the first AP 110 to a second AP 120 or from the second AP 120 to one of its STAs. This message format 1100 may be used to communicate parameters that define conditions or stipulations (also referred to as preconditions) for the OBSS to utilize a resource assignment in a coordinated transmission. FIG. 11 includes an example data frame 1120. The data frame 1120 may include a preamble 1122, a frame header 1124, a frame body 1110, and a frame check sequence (FCS) 1126. If included, the preamble 1122 may include one or more bits to establish synchronization. The preamble 1122 may be omitted in some WLANs where synchronization can be established by regular communications. The frame header 1124 may include source and destination network addresses (such as the network address of the sending AP and receiving AP, respectively), the length of data frame, or other frame control information. The frame body 1110 may be organized with a message format and may include a variety of fields or information elements 1132, 1136 and 1138.

Example information elements 1160 are shown in FIG. 11. The example information elements 1160 include a field 1162 with the CO-UL parameter, a field 1164 with the CO-DL parameter, and a field 1166 with the resource assignment. In some implementations, the first AP 110 (as TXOP owner) may send either the CO-UL parameter or the CO-DL parameter in a MAP-Sch-Trigger message. Alternatively, the first AP 110 may send both the CO-UL parameter and the CO-DL parameter.

Figure 12:
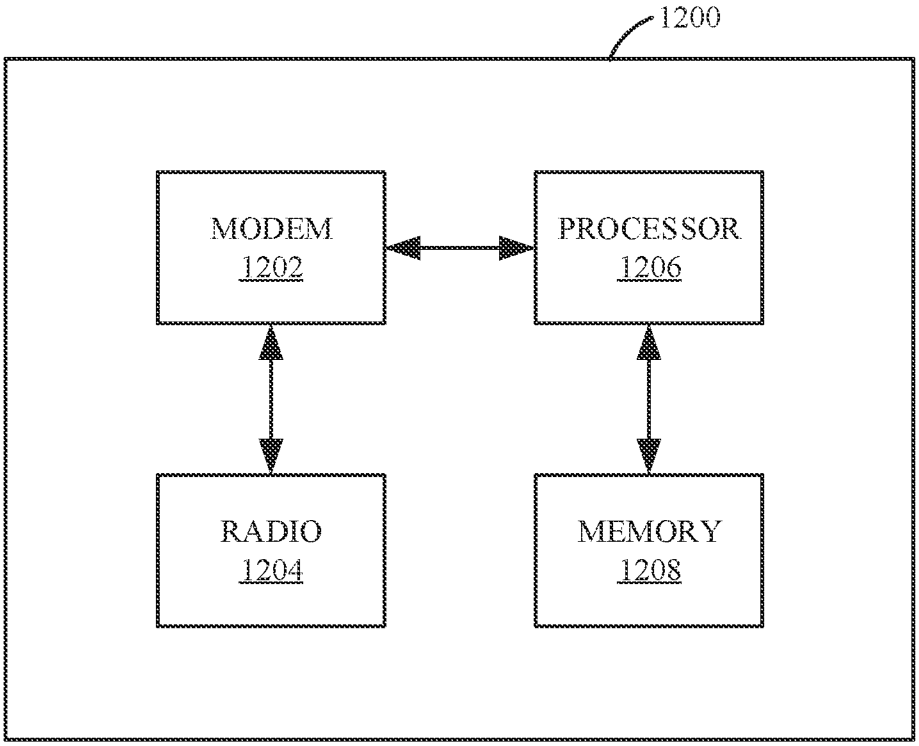
FIG. 12 shows a block diagram of an example wireless communication device.

FIG. 12 shows a block diagram of an example wireless communication device 1200. In some implementations, the wireless communication device 1200 can be an example of a device for use in a STA such as one of the STAs 104, 114, 124, and 134 described above with reference to FIGS. 1A and 1B. In some implementations, the wireless communication device 1200 can be an example of a device for use in an AP such as the APs 102, 110, 120, and 130 described above with reference to FIGS. 1A and 1B. The wireless communication device 1200 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.1lay, 802.11ax, 802.11az, 802.11ba and 802.11be.

The wireless communication device 1200 can be, or can include, a chip, system on chip (SoC), chipset, package or device that includes one or more modems 1202, for example, a Wi-Fi (IEEE 802.11 compliant) modem. In some implementations, the one or more modems 1202 (collectively "the modem 1202") additionally include a WWAN modem (for example, a 3GPP 4G LTE or 5G compliant modem). In some implementations, the wireless communication device 1200 also includes one or more radios 1204 (collectively "the radio 1204"). In some implementations, the wireless communication device 1206 further includes one or more processors, processing blocks or processing elements 1206 (collectively "the processor 1206") and one or more memory blocks or elements 1208 (collectively "the memory 1208").

The modem 1202 can include an intelligent hardware block or device such as, for example, an application-specific integrated circuit (ASIC) among other possibilities. The modem 1202 is generally configured to implement a PHY layer. For example, the modem 1202 is configured to modulate packets and to output the modulated packets to the radio 1204 for transmission over the wireless medium. The modem 1202 is similarly configured to obtain modulated packets received by the radio 1204 and to demodulate the packets to provide demodulated packets. In addition to a modulator and a demodulator, the modem 1202 may further include digital signal processing (DSP) circuitry, automatic gain control (AGC), a coder, a decoder, a multiplexer and a demultiplexer. For example, while in a transmission mode, data obtained from the processor 1206 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1204. In implementations involving beamforming, the modulated symbols in the respective spatial streams are precoded via a steering matrix prior to their provision to the IFFT block.

While in a reception mode, digital signals received from the radio 1204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1206) for processing, evaluation, or interpretation.

The radio 1204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1200 can include, or be coupled with, multiple transmit antennas (each with a corresponding transmit chain) and multiple receive antennas (each with a corresponding receive chain). The symbols output from the modem 1202 are provided to the radio 1204, which then transmits the symbols via the coupled antennas. Similarly, symbols received via the antennas are obtained by the radio 1204, which then provides the symbols to the modem 1202.

The processor 1206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1206 processes information received through the radio 1204 and the modem 1202, and processes information to be output through the modem 1202 and the radio 1204 for transmission through the wireless medium. For example, the processor 1206 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1206 may generally control the modem 1202 to cause the modem to perform various operations described above.

The memory 1204 can include tangible storage media such as random-access memory (RAM) or read-only memory (ROM), or combinations thereof. The memory 1204 also can store non-transitory processor- or computer-executable software (SW) code containing instructions that, when executed by the processor 1206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 13A:
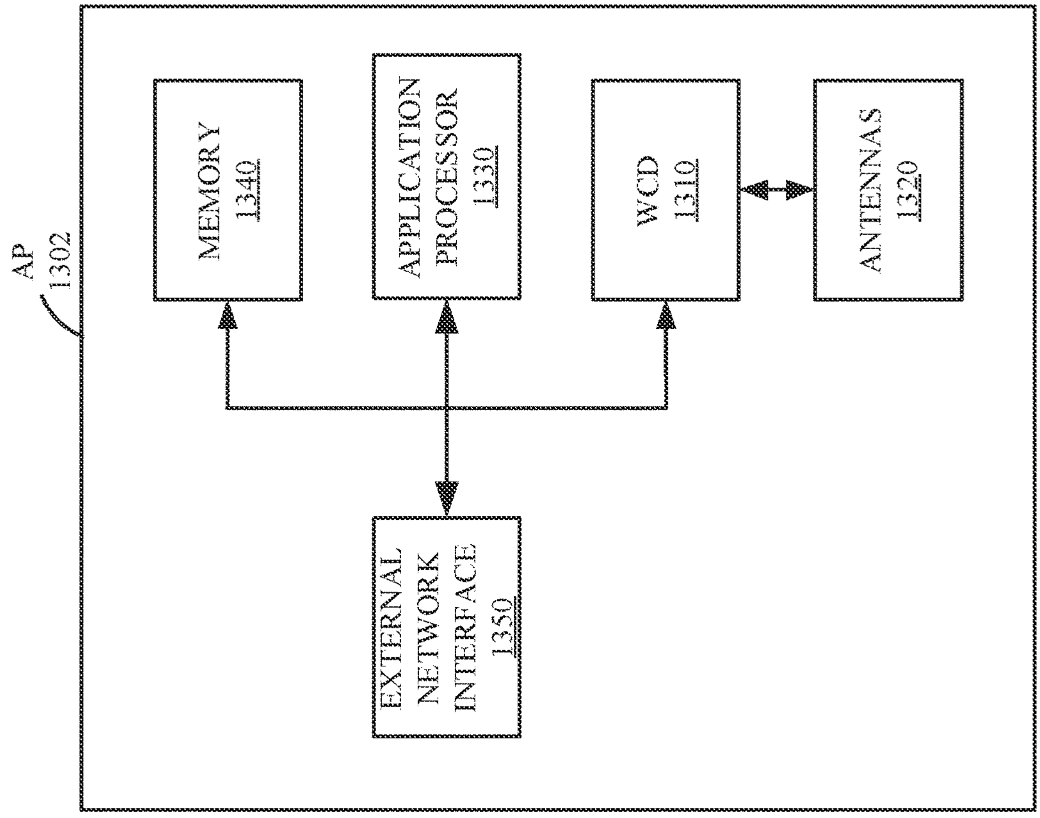
FIG. 13A shows a block diagram of an example access point (AP).

FIG. 13A shows a block diagram of an example AP 1302. For example, the AP 1302 can be an example implementation of the APs 102, 110, 120, and 130 described with reference to FIGS. 1A and 1B. The AP 1302 includes a wireless communication device (WCD) 1310 (although the AP 1302 may itself also be referred to generally as a wireless communication device as used herein). For example, the wireless communication device 1310 may be an example implementation of the wireless communication device 1200 described with reference to FIG. 12. The AP 1302 also includes multiple antennas 1320 coupled with the wireless communication device 1310 to transmit and receive wireless communications. In some implementations, the AP 1302 additionally includes an application processor 1330 coupled with the wireless communication device 1310, and a memory 1340 coupled with the application processor 1330. The AP 1302 further includes at least one external network interface 1350 that enables the AP 1302 to communicate with a core network or backhaul network to gain access to external networks including the Internet. For example, the external network interface 1350 may include one or both of a wired (for example, Ethernet) network interface and a wireless network interface (such as a WWAN interface). Ones of the aforementioned components can communicate with other ones of the components directly or indirectly, over at least one bus. The AP 1302 further includes a housing that encompasses the wireless communication device 1310, the application processor 1330, the memory 1340, and at least portions of the antennas 1320 and external network interface 1350.

Figure 13B:
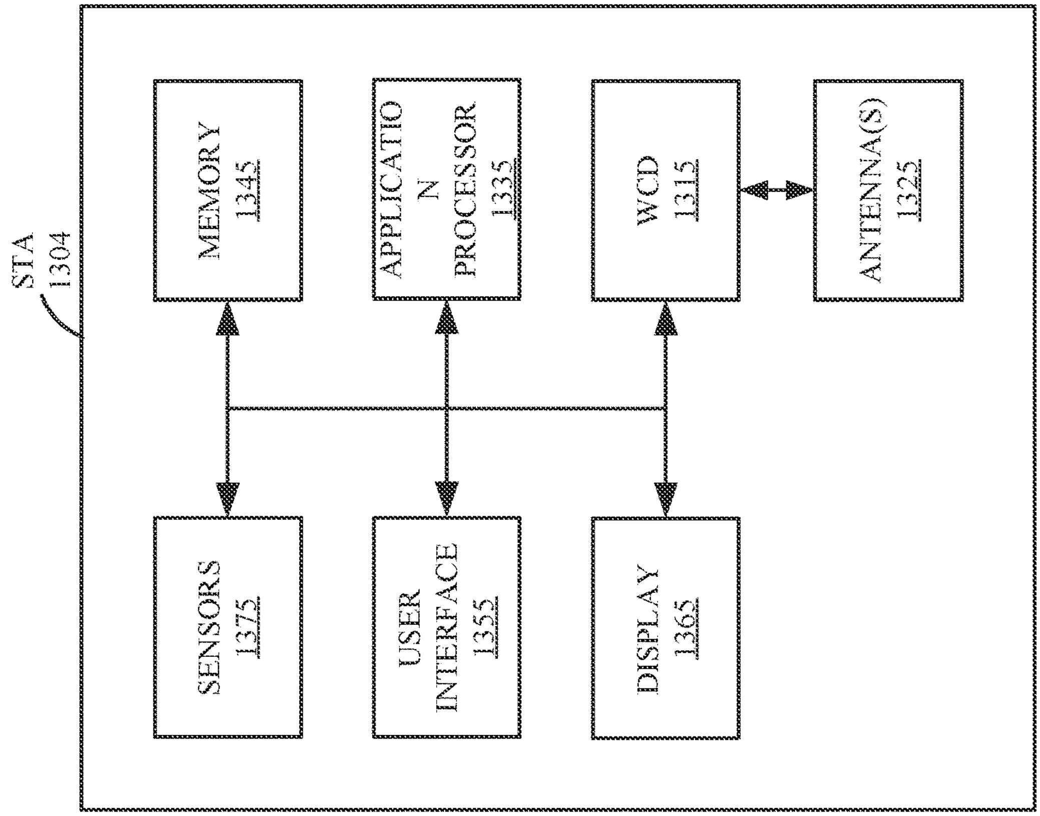
FIG. 13B shows a block diagram of an example station (STA).

FIG. 13B shows a block diagram of an example STA 1304. For example, the STA 1304 can be an example implementation of the STAs 104, 114, 124, and 134 described with reference to FIGS. 1A and 1B. The STA 1304 includes a wireless communication device 1315 (although the STA 1304 may itself also be referred to generally as a wireless communication device as used herein). For example, the wireless communication device 1315 may be an example implementation of the wireless communication device 1200 described with reference to FIG. 12. The STA 1304 also includes one or more antennas 1325 coupled with the wireless communication device 1315 to transmit and receive wireless communications. The STA 1304 additionally includes an application processor 1335 coupled with the wireless communication device 1315, and a memory 1345 coupled with the application processor 1335. In some implementations, the STA 1304 further includes a user interface (UI) 1355 (such as a touchscreen or keypad) and a display 1365, which may be integrated with the UI 1355 to form a touchscreen display. In some implementations, the STA 1304 may further include one or more sensors 1375 such as, for example, one or more inertial sensors, accelerometers, temperature sensors, pressure sensors, or altitude sensors. Ones of the aforementioned components can communicate with other ones of the components directly or indirectly, over at least one bus. The STA 1304 further includes a housing that encompasses the wireless communication device 1315, the application processor 1335, the memory 1345, and at least portions of the antennas 1325, UI 1355, and display 1365.

Various implementations of this disclosure generally relate to coordinated transmissions by different WLANs during a TXOP of a wireless channel. In some aspects of the disclosure, a scheme for multi-AP scheduling is provided, in which a first AP may gain channel access and become a TXOP owner. The TXOP owner may provide a resource assignment out of the TXOP for use by a neighboring AP (such as another AP for another BSS which is not a TXOP owner for this TXOP). During a coordinated transmission, the first WLAN and the second WLAN may concurrently communicate using different resources of a wireless channel. In accordance with this disclosure, an uplink power limit or a downlink power limit can be determined by the OBSS. A parameter (such as a CO-UL parameter or a CO-DL parameter) can be calculated and provided by the TXOP owner. The parameter is a value that can be shared to the OBSS AP or OBSS STA. The OBSS AP or OBSS STA can use the parameter and an RSSI measurement from the BSS of the TXOP owner to determine the uplink power limit or a downlink power limit. If the OB SS AP or OBSS STA can send a coordinated transmission with a transmission power below the uplink power limit or a downlink power limit, then the OB SS AP or OBSS STA may proceed with using the resource assignment for the coordinated transmission. Otherwise, if the OBSS AP or OB SS STA requires a transmit power above the uplink power limit or a downlink power limit, then the OBSS AP or OB SS STA may refrain from using the resource assignment for the coordinated transmission.

Particular implementations of the subject matter described in this disclosure can be implemented to realize one or more of the following potential advantages. A first AP (as TXOP owner) may share a frequency portion (as a resource assignment) of a TXOP with a second AP (a neighboring AP) for a coordinated transmission during a portion of the TXOP. The second AP can use the resource assignment if doing so would not interfere with the first AP's use of the TXOP. Thus, the TXOP owner is not penalized for sharing part of the TXOP, while the use of coordinated transmissions can improve the spectral efficiency of the wireless channel. Furthermore, in some implementations, the use of coordinated transmissions can be enabled without direct management or backhaul coordination by different WLANs that share the wireless channel. The use of a CO-UL parameter or a CO-DL parameter may represent a concise metric that provides sufficient information for the second WLAN to determine whether to participate in the coordinated transmission.

Figure 14:
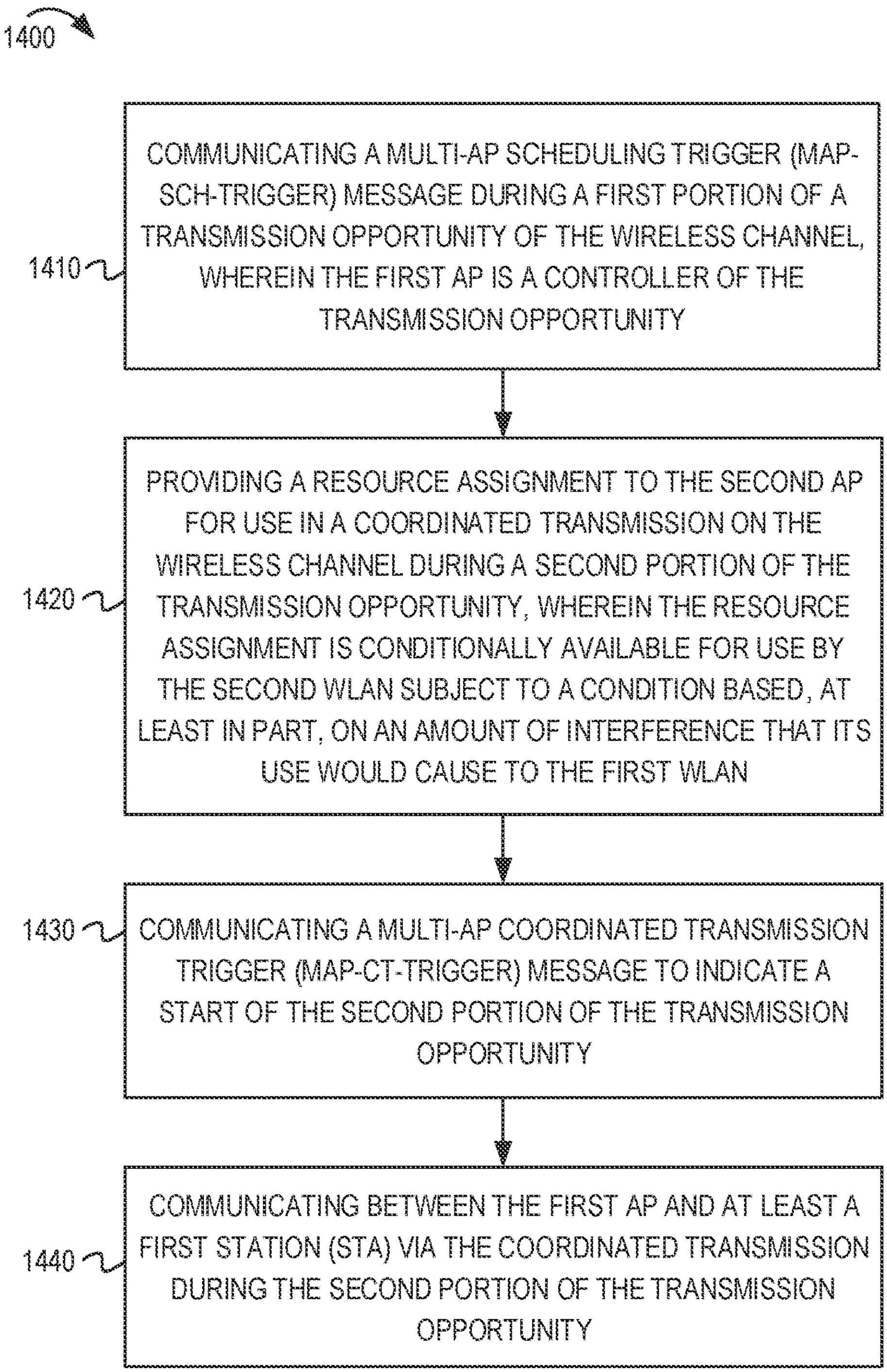
FIG. 14 shows a flowchart illustrating an example process for coordinated transmissions performed by a first AP according to some implementations.

FIG. 14 shows a flowchart illustrating an example process for coordinated transmissions performed by a first AP according to some implementations. In some implementations, the process 1400 may be performed by a TXOP owner, such as the first AP 110 in the examples of this disclosure. In some implementations, the process 1400 begins in block 1410 with communicating a multi-AP scheduling trigger (MAP-Sch-Trigger) message during the first portion of a transmission opportunity of the wireless channel. The first AP may be a controller of the transmission opportunity. For example, the first AP may win a contention-based procedure to become the TXOP owner of the TXOP.

In block 1420, the process 1400 proceeds with providing a resource assignment to the second AP for use in a coordinated transmission on the wireless channel during a second portion of the transmission opportunity. The resource assignment is may be conditionally available for use by the second WLAN subject to a condition based, at least in part, on an amount of interference that its use would cause to the first WLAN.

In block 1430, the process 1400 proceeds with communicating a multi-AP coordinated transmission trigger (MAP-CT-Trigger) message to indicate a start of the second portion of the transmission opportunity.

In block 1440, the process 1400 proceeds with communicating between the first AP and at least a first station (STA) via the coordinated transmission during the second portion of the transmission opportunity. The first STA may be associated with the first AP and part of the first WLAN.

In some implementations, the coordinated transmission may be configured for concurrent uplink communication from the first STA to the first AP and from a second STA to the second AP. The condition may be configured to prevent the second STA from using the resource assignment when its use would cause interference to the first AP above the threshold.

In some implementations, the process 1400 includes communicating a CO-UL parameter in the MAP-Sch-Trigger message. The CO-UL parameter may be based, at least in part, on an amount of interference that the first AP will tolerate as a result of the second WLAN using the resource assignment.

Figure 15:
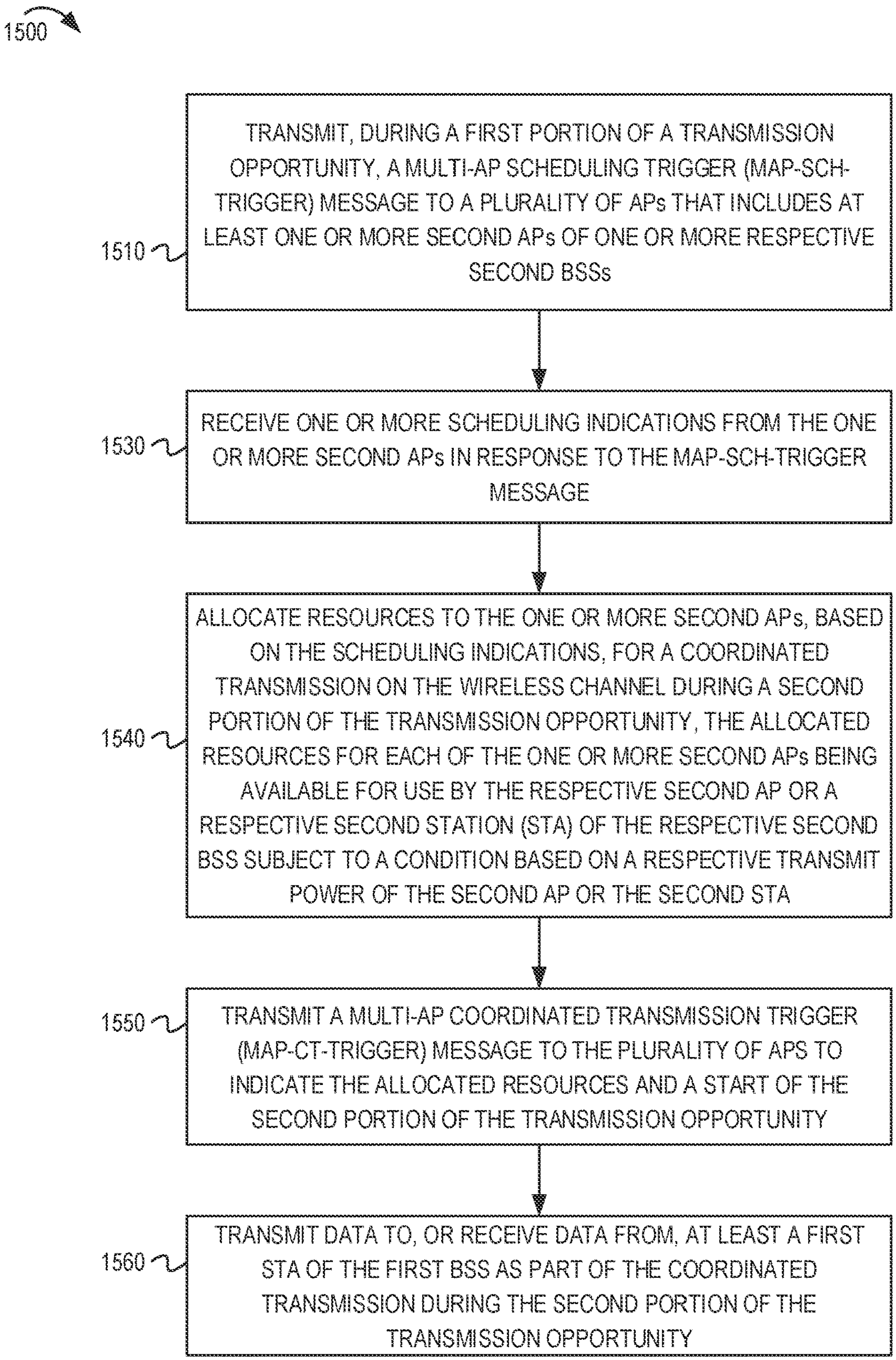
FIG. 15 shows a flowchart illustrating another example process for coordinated transmissions performed by a first AP according to some implementations.

FIG. 15 shows a flowchart illustrating another example process for coordinated transmissions performed by a first AP according to some implementations. In some implementations, the process 1500 may be performed by a TXOP owner, such as the first AP 110 in the examples of this disclosure. In some implementations, the process 1500 begins in block 1510 with transmitting, during a first portion of a transmission opportunity, a multi-AP scheduling trigger (MAP-Sch-Trigger) message to a plurality of APs. The plurality of APs may include one or more second APs of one or more respective second BSSs.

In block 1530, the process 1500 proceeds with receiving one or more scheduling indications from the one or more second APs in response to the MAP-Sch-Trigger message.

In block 1540, the process 1500 proceeds with allocating resources to the one or more second APs, based on the scheduling indications, for a coordinated transmission on the wireless channel during a second portion of the transmission opportunity, the allocated resources for each of the one or more second APs being available for use by the respective second AP or a respective second station (STA) of the respective second BSS subject to a condition based on a respective transmit power of the second AP or the second STA.

In block 1550, the process 1500 proceeds with transmitting a multi-AP coordinated transmission trigger (MAP-CT-Trigger) message to the plurality of APs to indicate the allocated resources and a start of the second portion of the transmission opportunity.

Figure 16:
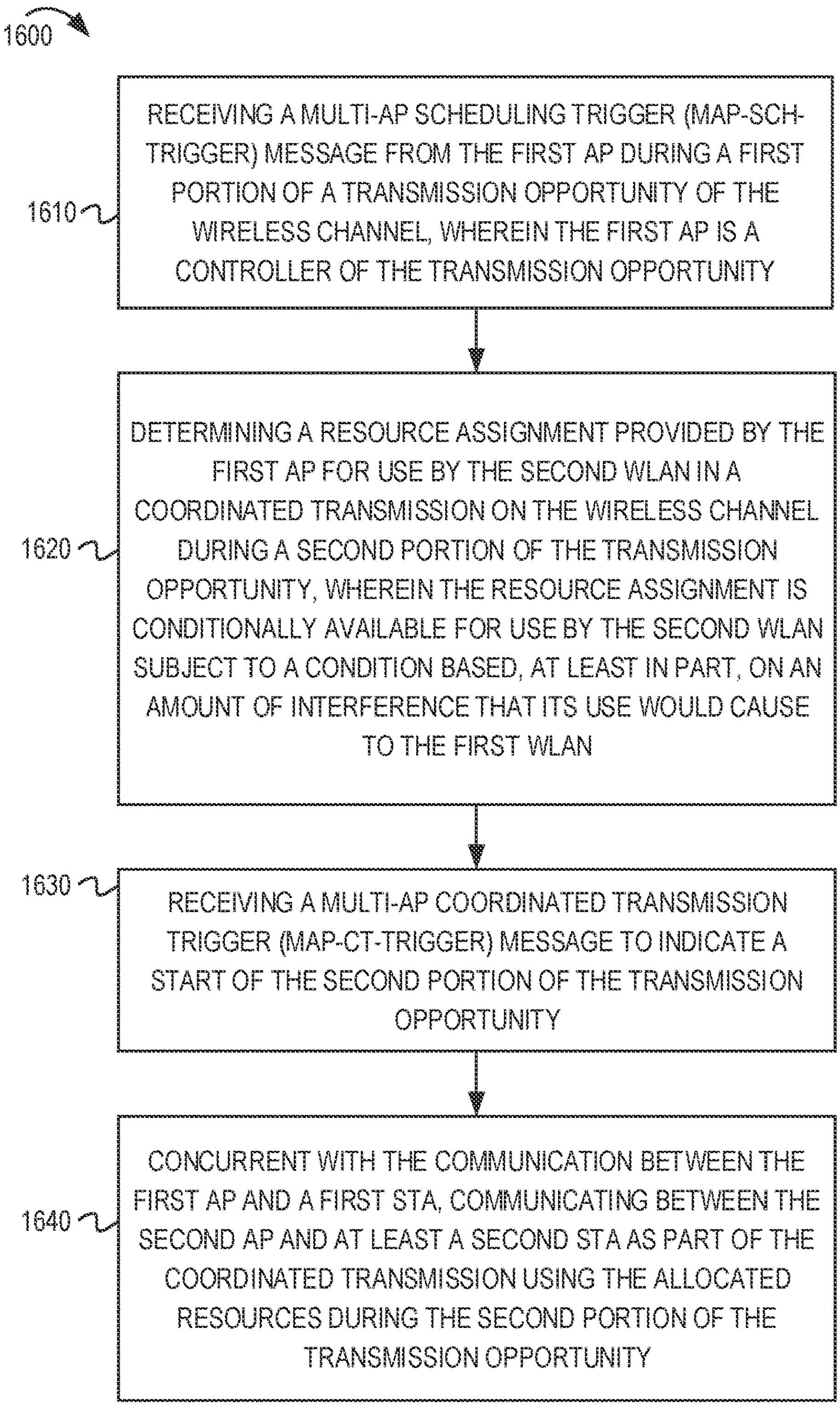
FIG. 16 shows a flowchart illustrating an example process for coordinated transmissions performed by a second AP according to some implementations.

In block 1560, the process 1500 proceeds with transmitting data to, or receiving data from, at least a first STA of the first BSS as part of the coordinated transmission during the second portion of the transmission opportunity FIG. 16 shows a flowchart illustrating an example process 1600 for coordinated transmissions performed by a second AP according to some implementations. In some implementations, the process 1600 may be performed by a neighboring AP, such as the second AP 120 in the examples of this disclosure. In some implementations, the process 1600 begins in block 1610 with receiving a multi-AP scheduling trigger (MAP-Sch-Trigger) message from the first AP during a first portion of a transmission opportunity of the wireless channel, wherein the first AP is a controller of the transmission opportunity.

In block 1620, the process 1600 proceeds with determining a resource assignment provided by the first AP for use by the second WLAN in a coordinated transmission on the wireless channel during a second portion of the transmission opportunity. The resource assignment may be conditionally available for use by the second WLAN subject to a condition based, at least in part, on an amount of interference that its use would cause to the first WLAN.

In block 1630, the process 1600 proceeds with receiving a MAP-CT-Trigger message to indicate a start of the second portion of the transmission opportunity.

In block 1640, the process 1600 proceeds with communicating between the second AP and at least a second STA via the coordinated transmission during the second portion of the transmission opportunity, concurrently with the communication between the first AP and a first STA.

In some implementations, the coordinated transmission is configured for concurrent uplink communication from the first STA to the first AP and from the second STA to the second AP. The condition may be configured to prevent the second STA from using the resource assignment when its use would cause interference to the first AP above the threshold.

In some implementations, the coordinated transmission is configured for concurrent downlink communication from the first AP to the first STA and from the second AP to the second STA. The condition may be configured to prevent the second AP from using the resource assignment when its use would cause interference to the first STA above the threshold.

Figure 17:
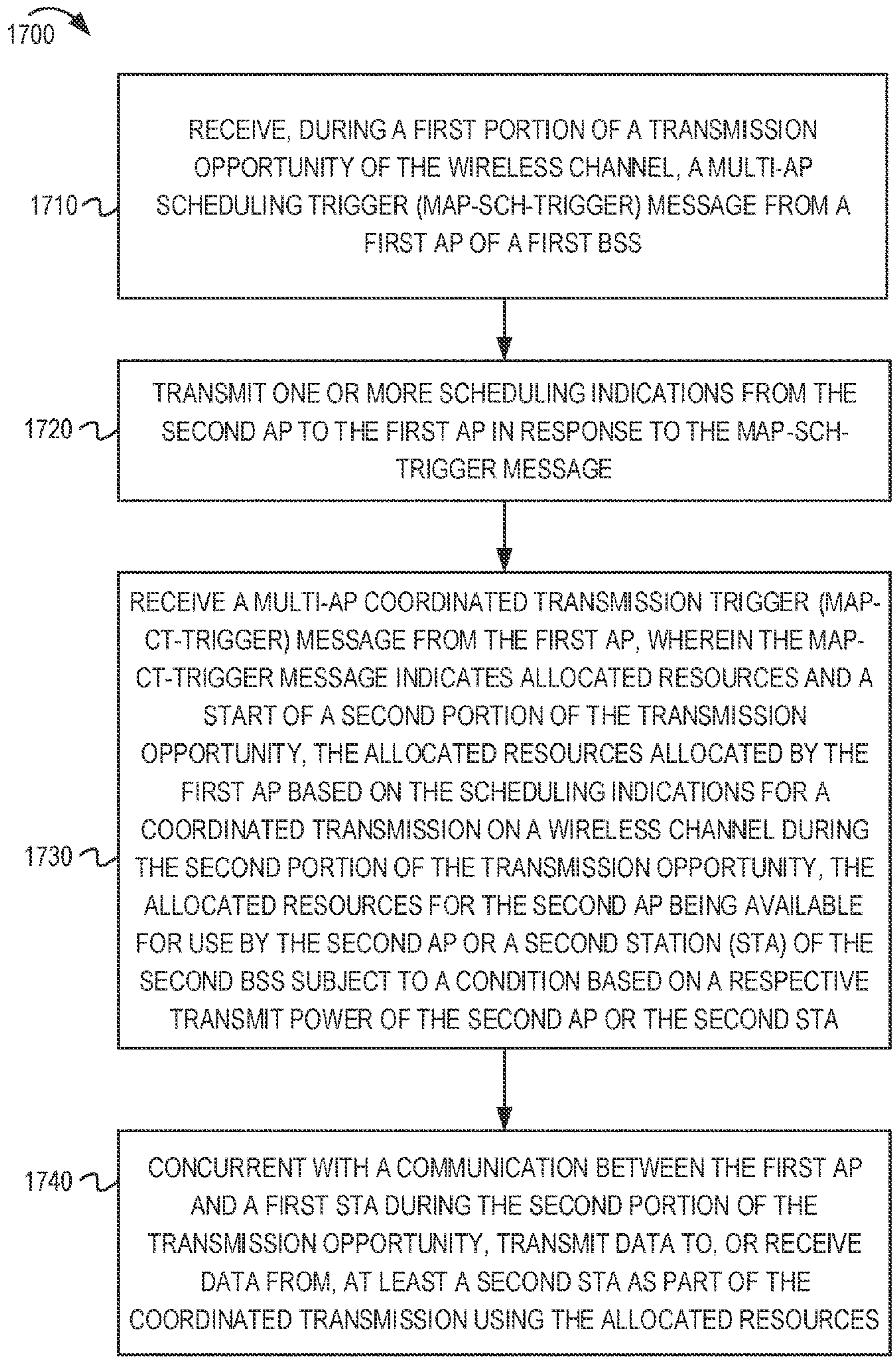
FIG. 17 shows a flowchart illustrating another example process for coordinated transmissions performed by a second AP according to some implementations.

FIG. 17 shows a flowchart illustrating an example process 1700 for coordinated transmissions performed by a second AP according to some implementations. In some implementations, the process 1700 may be performed by a neighboring AP, such as the second AP 120 in the examples of this disclosure. In some implementations, the process 1700 begins in block 1710 with receiving, during a first portion of a transmission opportunity of the wireless channel, a multi-AP scheduling trigger (MAP-Sch-Trigger) message from a first AP of a first BSS. For example, the first AP may be a controller of the transmission opportunity.

In block 1720, the process 1700 proceeds with transmitting one or more scheduling indications from the second AP to the first AP in response to the MAP-Sch-Trigger message.

In block 1730, the process 1700 proceeds with receiving a multi-AP coordinated transmission trigger (MAP-CT-Trigger) message from the first AP, wherein the MAP-CT-Trigger message indicates allocated resources and a start of a second portion of the transmission opportunity, the allocated resources allocated by the first AP based on the scheduling indications for a coordinated transmission on a wireless channel during the second portion of the transmission opportunity, the allocated resources for the second AP being available for use by the second AP or a second station (STA) of the second BSS subject to a condition based on a respective transmit power of the second AP or the second STA.

In block 1740, the process 1700 proceeds with transmitting data to, or receiving data from, at least a second STA as part of the coordinated transmission using the allocated resources concurrent with a communication between the first AP and a first STA during the second portion of the transmission opportunity.

Figure 18:
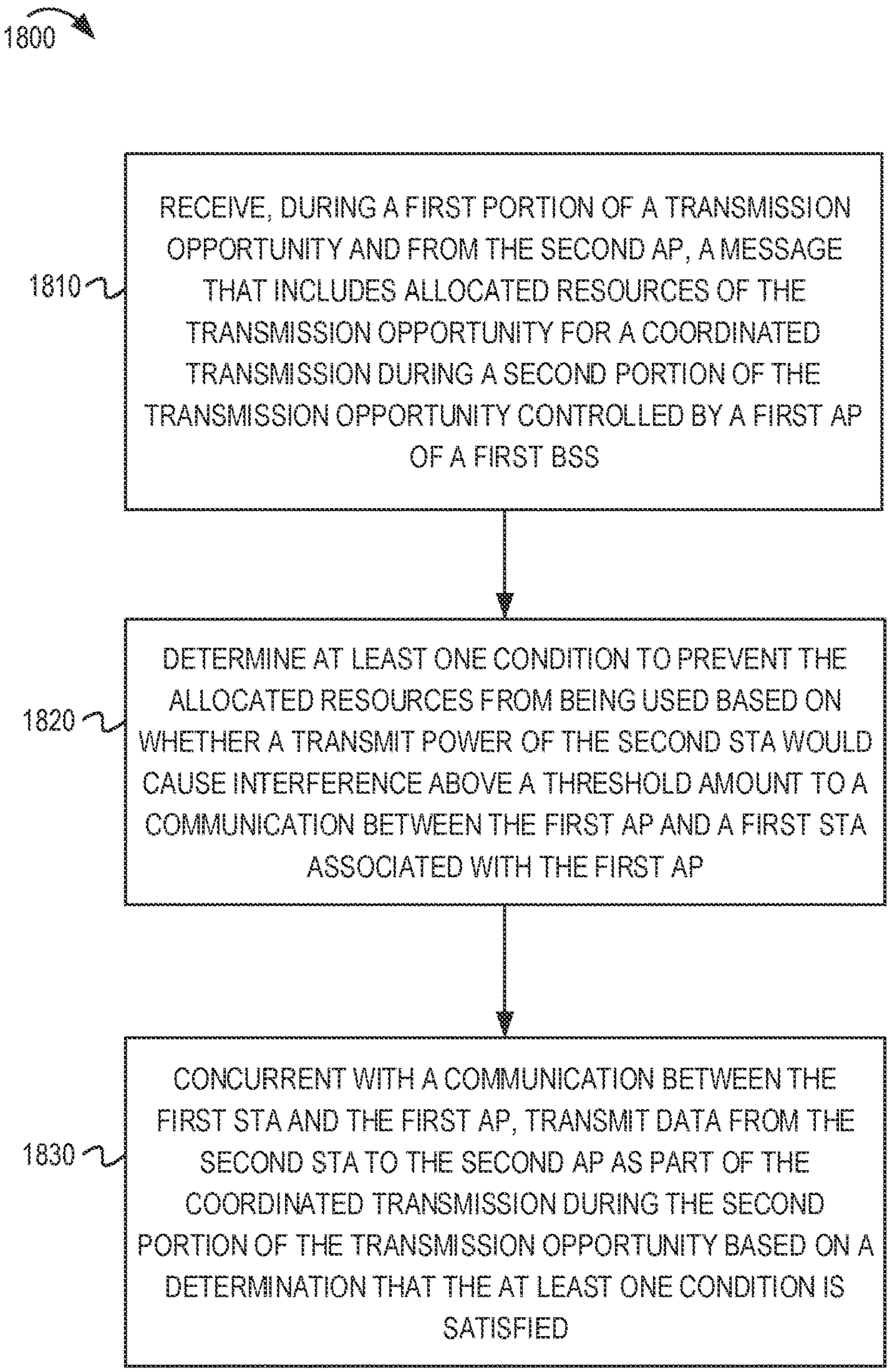
FIG. 18 shows a flowchart illustrating an example process for coordinated transmissions performed by a STA associated with neighboring AP according to some implementations.

FIG. 18 shows a flowchart illustrating an example process 1800 for coordinated transmissions performed by a STA associated with neighboring AP according to some implementations. In some implementations, the process 1800 may be performed by a STA of a neighboring AP, such as the second STA 124 in the examples of this disclosure. In some implementations, the process 1800 begins in block 1810 with receiving, during a first portion of a transmission opportunity and from the second AP, a message that includes allocated resources of the transmission opportunity for a coordinated transmission during a second portion of the transmission opportunity controlled by a first AP of a first BSS.

In block 1820, the process 1800 proceeds with determining at least one condition to prevent the allocated resources from being used based on whether a transmit power of the second STA would cause interference above a threshold amount to a communication between the first AP and a first STA associated with the first AP.

In block 1830, the process 1800 proceeds with, concurrent with a communication between the first STA and the first AP, transmitting data from the second STA to the second AP as part of the coordinated transmission during the second portion of the transmission opportunity based on a determination that the at least one condition is satisfied.

In some implementations, the condition is based on a CO-UL parameter and a transmit power setting of the second STA. For example, the second STA may receive, with the scheduling indicator, the CO-UL parameter and an identifier of the first AP. The second STA may detect, using the identifier of the first AP, a multi-AP coordinated transmission trigger (MAP-CT-Trigger) message transmitted from the first AP. The second STA may measure a signal strength of the MAP-CT-Trigger message. The second STA may determine an uplink power limit for the coordinated transmission from the second STA to the second AP based, at least in part, on the signal strength and the CO-UL parameter. The second STA may determine whether the condition is satisfied based, at least in part, on the uplink power limit and a transmit power setting of the second STA. For example, the condition may be satisfied if the transmit power setting of the second STA is lower than the uplink power limit.

Figure 19:
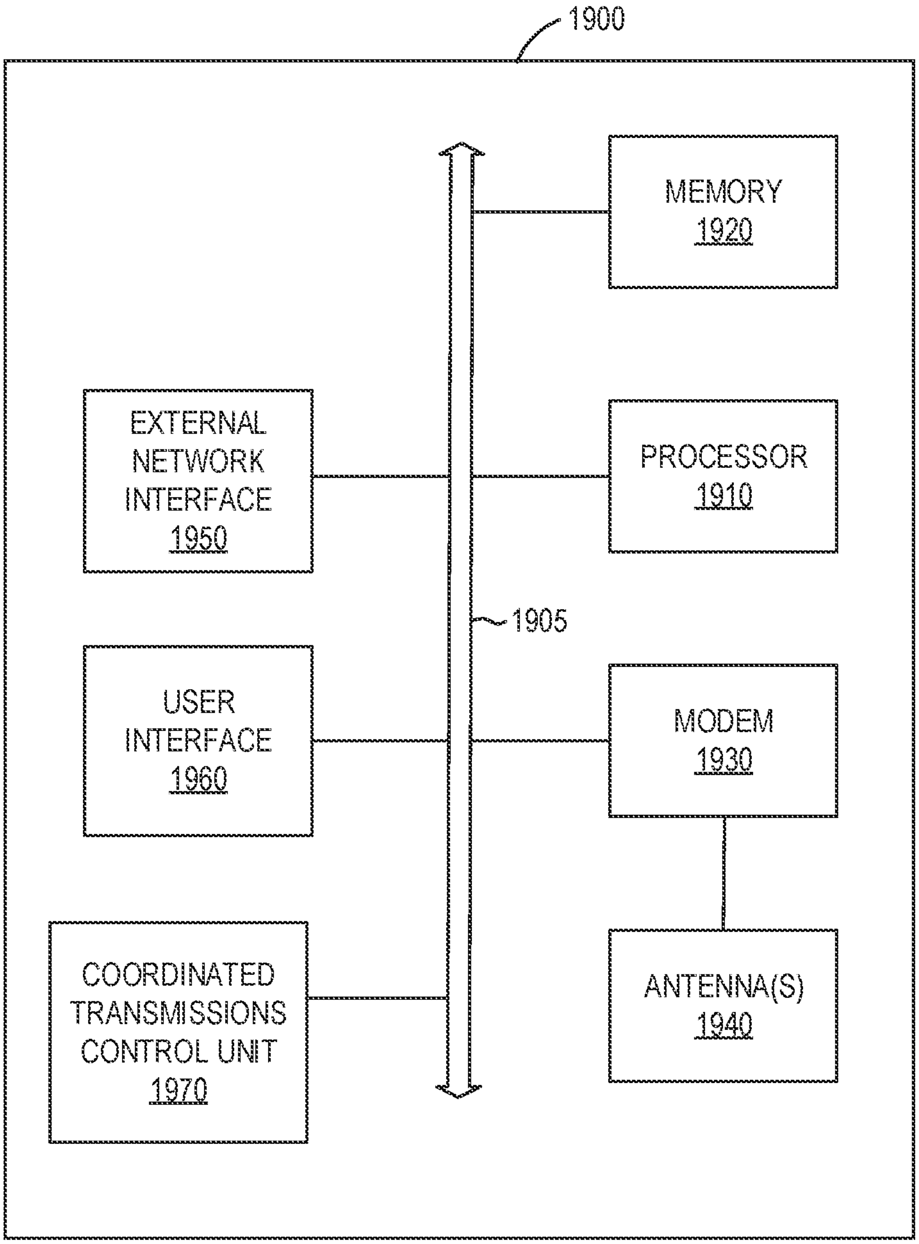
FIG. 19 shows a block diagram of an example AP according to some implementations.

FIG. 19 shows a block diagram of an example AP 1900 according to some implementations. For example, the AP 1900 may be an example of aspects of the AP 102, the AP 1302, the first AP 110, the second AP 120, or the third AP 130 described with reference to other Figures of this disclosure. The AP 1900 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 802.11az, and 802.11ba). The AP 1900 includes at least one processor 1910 (collectively "the processor 1910"), at least one memory 1920 (collectively "the memory 1920"), at least one modem 1930 (collectively "the modem 1930"), at least one antenna 1940 (collectively "the antenna 1940"), at least one external network interface 1950 (collectively "the network interface 1950") and, in some instances, a user interface (UI) 1960. Each of the components (or "modules") described with reference to FIG. 19 can communicate with other ones of the components, directly or indirectly, over at least one bus 1905. Although illustrated as being coupled to the bus 1905, the memory 1920 may be coupled to the processor 1910.

The processor 1910 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 1910 processes information received through the modem 1930 and the external network interface 1930. The processor 1910 also can process information to be sent to the modem 1930 for transmission through the antenna 1940 and information to be sent to the external network interface 1930. The processor 1910 can generally be configured to perform various operations related to generating and transmitting a downlink frame and receiving an uplink frame.

The memory 1920 can include random access memory (RAM) and read-only memory (ROM). The memory 1920 also can store processor- or computer-executable software (SW) code containing instructions that, when executed by the processor 1910, cause the processor to perform various functions described herein for wireless communication, including generation and transmission of a downlink frame and reception of an uplink frame.

The modem 1930 is generally configured to modulate packets and to provide the modulated packets to the antenna 1940 for transmission, as well as to demodulate packets received from the antenna 1940 to provide demodulated packets. The modem 1930 generally includes or is coupled with at least one radio frequency (RF) transmitter and at least one RF receiver, which may be combined into one or more transceivers, and which are in turn coupled to one or more antennas 1940. For example, in some AP implementations, the AP 1900 can include multiple transmit antennas (each with a corresponding transmit chain) and multiple receive antennas (each with a corresponding receive chain). The modem 1930 can communicate bi-directionally, via the antenna 1940, with at least one wireless device (such as the first STA 114 described with reference to FIG. 1B).

The modem 1930 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 1910 for processing, evaluation, or interpretation, for example, by one or more host applications executing on the processor.

The AP 1900 may communicate with a core or backhaul network through the external network interface 1950 to gain access to external networks including the Internet. For example, the external network interface 1950 may include one or both of a wired (for example, Ethernet) network interface or wireless (for example, LTE, 4G, or 5G) network interface.

The AP 1900 may include a coordinated transmissions control unit 1970. The coordinated transmissions control unit 1970 may implement any of the coordinated transmissions techniques described in this disclosure. For example, the coordinated transmissions control unit 1970 in the first AP 190 may be configured to make a resource assignment to a neighboring AP. The coordinated transmissions control unit 1970 may determine and transmit one or more parameters (such as the CO-UL parameter or the CO-DL parameter, or both) to a neighboring AP. The coordinated transmissions control unit 1970 in the neighboring AP (such as the second AP 120) may utilize the parameters to determine whether to use the resource assignment in accordance with implementations of this disclosure. In some implementations, the coordinated transmissions control unit 1970 may be distributed within the processor 1910, the memory 1920, and the bus 1905. The memory 1920 can include computer instructions executable by the processor 1910 to implement the functionality of the coordinated transmissions control unit 1970. Any of these functionalities may be partially (or entirely) implemented in hardware or on the processor 1910.

Figure 20:
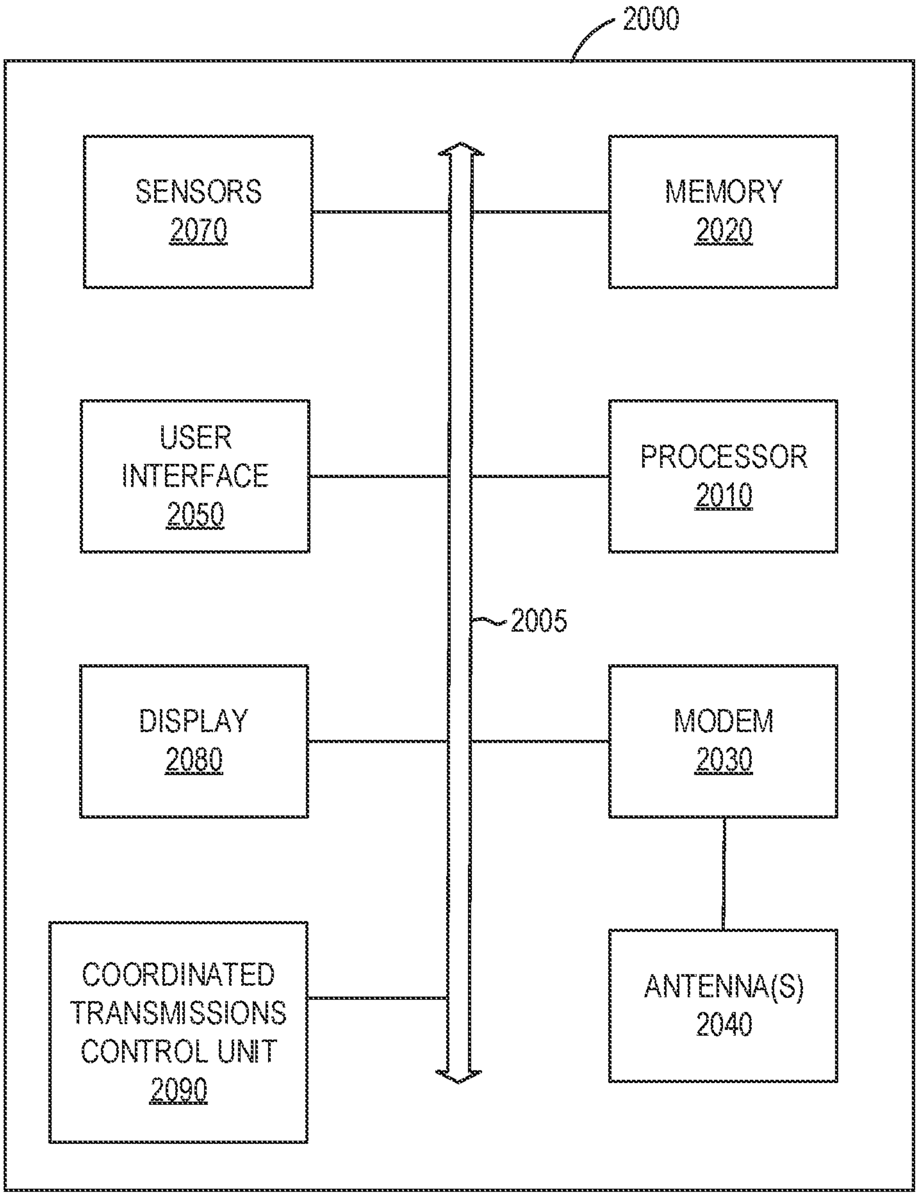
FIG. 20 shows a block diagram of an example STA according to some implementations.

FIG. 20 shows a block diagram of an example STA 1200 according to some implementations. For example, the wireless device 2000 may be an example of aspects of the STA 104, the STA 1304, the first STA 114, or the second STA 124 described with reference to other Figures in this disclosure. The wireless device 2000 may be capable of transmitting and receiving wireless communications, as well as of encoding and decoding such communications. The wireless communications may conform to any of a number of different wireless communication protocols. For example, the wireless device 2000 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, and 802.11ba). Additionally, or alternatively, the wireless device 2000 may be capable of transmitting and receiving Bluetooth packets conforming to a Bluetooth standard, such as defined in IEEE 802.15 or by the Bluetooth SIG. Additionally, or alternatively, the wireless device 2000 may be capable of transmitting and receiving wireless packets associated with the Long-Term Evolution (LTE), International Mobile Telecommunications-Advanced (IMT-Advanced) 4G or 5G standards.

The wireless device 2000 includes at least one processor 2010 (collectively "the processor 2010"), at least one memory 2020 (collectively "the memory 2020"), at least one modem 2030 (collectively "the modem 2030") and at least one antenna 2040 (collectively "the antenna 2040"). In some implementations, the wireless device 2000 additionally includes some or all of the following: a user interface (UI) 2050 (such as a touchscreen or keypad), one or more sensors 2070 (such as one or more inertial sensors, accelerometers, temperature sensors, pressure sensors, or altitude sensors), and a display 2080. Each of the components (or "modules") described with reference to FIG. 20 can communicate with one another, directly or indirectly, over at least one bus 2005. Although illustrated as being coupled to the bus 2005, the memory 2020 may be coupled to the processor 2010.

The processor 2010 includes an intelligent hardware device such as, for example, a CPU, a microcontroller, an ASIC or a PLD such as an FPGA, among other possibilities. The processor 2010 processes information received through the modem 2030 as well as information to be sent to the modem 2030 for transmission through the antenna 2040. The processor 2010 can be configured to perform various operations related to receiving a downlink frame and generating and transmitting an uplink frame.

The memory 2020 can include RAM and ROM. The memory 2020 also can store processor- or computer-executable SW code containing instructions that, when executed, cause the processor 2010 to perform various functions described herein for wireless communication, including reception of a downlink frame and generation and transmission of an uplink frame.

The modem 2030 is generally configured to modulate packets and provide the modulated packets to the antenna 2040 for transmission, as well as to demodulate packets received from the antenna 2040 to provide demodulated packets. The modem 2030 generally includes at least one radio frequency (RF) transmitter and at least one RF receiver, which may be combined into one or more transceivers, and which are in turn coupled to one or more antennas 2040. For example, in some implementations, the wireless device 2000 can include multiple transmit antennas (each with a corresponding transmit chain) and multiple receive antennas (each with a corresponding receive chain).

The modem 2030 can communicate bi-directionally, via the antenna 2040, with at least one AP (such as the first AP 110 or the second AP 120. As is described above, in some implementations, the modem also can communicate bi-directionally, via the antenna 2040, with other STAs directly without the use of an intermediary AP.

The modem 2030 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 2010 for processing, evaluation, or interpretation, for example, by one or more host applications executing on the processor.

The wireless device 2000 may include a coordinated transmissions control unit 2090. The coordinated transmissions control unit 2090 may implement any of the coordinated transmission techniques described in this disclosure. For example, the coordinated transmissions control unit 2090 may be configured to determine whether to use a resource assignment based on an RSSI measurement of the MAP-CT-Trigger message from the TXOP owner. In some implementations, the coordinated transmissions control unit 2090 may be distributed within the processor 2010, the memory 2020, and the bus 2005. The memory 2020 can include computer instructions executable by the processor 2010 to implement the functionality of the coordinated transmissions control unit 2090. Any of these functionalities may be partially (or entirely) implemented in hardware or on the processor 2010.

FIGS. 1-20 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device for use in a first station (STA) associated with a first access point (AP) of a first basic service set (BSS), comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

receive, from the first AP, a message that indicates allocated resources of a transmission opportunity for a coordinated transmission during a portion of the transmission opportunity controlled by a second AP of a second BSS; and concurrent with a communication between the second AP and a second STA associated with the second AP, transmit data from the first STA to the first AP as part of the coordinated transmission during the portion of the transmission opportunity.

2. The wireless communication device of claim 1, wherein:

a condition to prevent the allocated resources from being used based at least in part on whether a transmit power of the first STA would cause interference above a threshold amount to a communication between the second AP and a second STA associated with the second AP is based at least in part on an amount of interference that the second AP will tolerate as a result of the first STA using the allocated resources.

3. The wireless communication device of claim 2, wherein the processor-readable code, when executed by the at least one processor in conjunction with the at least one modem, is further configured to:

receive a coordinated uplink (CO-UL) parameter and an identifier of the second AP; and detect, using the identifier of the second AP, a multi-AP coordinated transmission trigger (MAP-CT-Trigger) message transmitted from the second AP, wherein the MAP-CT-Trigger message indicates a start of the portion of the transmission opportunity.

4. The wireless communication device of claim 3, wherein the processor-readable code, when executed by the at least one processor in conjunction with the at least one modem, is further configured to:

determine whether to use the allocated resources based at least in part on the CO-UL parameter.

5. The wireless communication device of claim 3, wherein the processor-readable code, when executed by the at least one processor in conjunction with the at least one modem, is further configured to:

measure a signal strength of the MAP-CT-Trigger message; and determine an uplink power limit for the coordinated transmission from the first STA to the second AP based at least in part on the signal strength and the CO-UL parameter.

6. The wireless communication device of claim 5, wherein the processor-readable code, when executed by the at least one processor in conjunction with the at least one modem, is further configured to:

determine whether the condition is satisfied based, at least in part, on the uplink power limit and a transmit power setting of the first STA.

7. The wireless communication device of claim 1, wherein the allocated resources include at least one of time resources or frequency resources.

8. A wireless communication device for use in a first access point (AP) of a first basic service set (BSS), comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

transmit a multi-AP coordinated transmission trigger (MAP-CT-Trigger) message to a plurality of APs to indicate allocated resources and a start of a portion of a transmission opportunity controlled by the first AP, wherein the allocated resources include at least one of time resources or frequency resources, and wherein the allocated resources are allocated to one or more second APs of the plurality of APs for a coordinated transmission on a wireless channel during the portion of the transmission opportunity; and transmit data to, or receive data from, at least a first STA of the first BSS as part of the coordinated transmission during the portion of the transmission opportunity.

9. The wireless communication device of claim 8, wherein the processor-readable code, when executed by the at least one processor in conjunction with the at least one modem, is further configured to operate as a controller of the transmission opportunity based at least in part on a determination that the first AP has won contention for the transmission opportunity.

10. The wireless communication device of claim 8, wherein the first AP is a master AP or other AP having a dedicated role as a controller of transmission opportunities including the transmission opportunity.

11. The wireless communication device of claim 8, wherein:

the coordinated transmission includes concurrent uplink communications from the first STA to the first AP and from one or more second STAs to the one or more second APs; and a condition to which the one or more second APs or the one or more second STAs are subject is configured to prevent the one or more second STAs from using the allocated resources when a transmit power of the one or more second STAs is above a threshold.

12. The wireless communication device of claim 11, wherein the processor-readable code, when executed by the at least one processor in conjunction with the at least one modem, is further configured to include a coordinated uplink (CO-UL) parameter in a multi-AP scheduling trigger (MAP-Sch-Trigger) message, the CO-UL parameter indicating the condition.

13. The wireless communication device of claim 12, wherein the CO-UL parameter is based at least in part on the transmit power of the first AP and an amount of interference that the first AP will tolerate.

14. The wireless communication device of claim 12, wherein:

the MAP-Sch-Trigger message is configured to cause the one or more second APs to retransmit the CO-UL parameter to the one or more second STAs, and the CO-UL parameter is usable by each of the one or more second STAs to determine whether its transmit power would cause interference to the first AP above the threshold.

15. The wireless communication device of claim 8, wherein:

the coordinated transmission includes concurrent downlink communications from the first AP to the first STA and from the one or more second APs to one or more second STAs, and a condition to which the one or more second APs or the one or more second STAs are subject is configured to prevent the one or more second APs from using the allocated resources when a transmit power of the one or more second APs is above a threshold.

16. The wireless communication device of claim 15, wherein the processor-readable code, when executed by the at least one processor in conjunction with the at least one modem, is further configured to, during the transmission opportunity:

indicate to the first STA to transmit a test communication for measuring a first received signal strength indicator (RSSI) between the first STA and the first AP, wherein the test communication is either a null packet or quality of service (QOS) packet;

determine a coordinated downlink (CO-DL) parameter based, at least in part, on an estimated transmit power of the first AP for the coordinated transmission and an estimated channel quality between the first AP and the first STA, wherein the estimated channel quality is estimated based at least in part on the first RSSI; and include the CO-DL parameter to the one or more second APs in either a multi-AP scheduling trigger (MAP-Sch-Trigger) message or the MAP-CT-Trigger message.

17. A method performed by a first station (STA) associated with a first access point (AP) of a first basic service set (BSS), comprising:

receiving, from the first AP, a message that indicates allocated resources of a transmission opportunity for a coordinated transmission during a portion of the transmission opportunity controlled by a second AP of a second BSS; and concurrent with a communication between the second AP and a second STA associated with the first AP, transmitting data from the first STA to the first AP as part of the coordinated transmission during the portion of the transmission opportunity.

18. The method of claim 17, wherein a condition to prevent the allocated resources from being used based at least in part on whether a transmit power of the first STA would cause interference above a threshold amount to a communication between the second AP and a second STA associated with the second AP is based at least in part on an amount of interference that the second AP will tolerate as a result of the first STA using the allocated resources.

19. The method of claim 18, the method further comprising:

receiving a coordinated uplink (CO-UL) parameter and an identifier of the second AP, detecting, using the identifier of the second AP, a multi-AP coordinated transmission trigger (MAP-CT-Trigger) message transmitted from the second AP, wherein the MAP-CT-Trigger message indicates a start of the portion of the transmission opportunity; and determining whether to use the allocated resources based at least in part on the CO-UL parameter.

20. The method of claim 19, further comprising, before the coordinated transmission:

measuring a signal strength of the MAP-CT-Trigger message; and determining an uplink power limit for the coordinated transmission from the first STA to the first AP based at least in part on the signal strength and the CO-UL parameter.

* * * * *